US011867179B2

(12) United States Patent
Koh et al.

(10) Patent No.: US 11,867,179 B2
(45) Date of Patent: Jan. 9, 2024

(54) FLUID TRANSFER APPARATUS WITH A PLURALITY OF ROTOR HOUSINGS ARRANGED AT DIFFERENT ANGULARITY WITH THE NEIGHBORING ROTOR HOUSINGS

(71) Applicant: KOREA ATOMIC ENERGY RESEARCH INSTITUTE, Daejeon (KR)

(72) Inventors: Yongkwon Koh, Daejeon (KR); Jangsoon Kwon, Goyang-si (KR); Minhoon Baik, Daejeon (KR); Jaekwang Lee, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 444 days.

(21) Appl. No.: 17/257,097

(22) PCT Filed: Jul. 3, 2019

(86) PCT No.: PCT/KR2019/008145
§ 371 (c)(1),
(2) Date: Dec. 30, 2020

(87) PCT Pub. No.: WO2020/009474
PCT Pub. Date: Jan. 9, 2020

(65) Prior Publication Data

US 2021/0123438 A1 Apr. 29, 2021

(30) Foreign Application Priority Data

Jul. 3, 2018 (KR) ........................ 10-2018-0077183

(51) Int. Cl.
*F04C 23/00* (2006.01)
*F04C 2/22* (2006.01)
(Continued)

(52) U.S. Cl.
CPC .............. *F04C 23/001* (2013.01); *F01C 1/22* (2013.01); *F01C 19/10* (2013.01); *F04C 2/22* (2013.01);
(Continued)

(58) Field of Classification Search
CPC ...... F01C 1/22; F02B 2053/005; F04C 18/22; F04C 2/22; F04C 2240/20; F04C 23/001; F04C 28/04
See application file for complete search history.

(56) References Cited

U.S. PATENT DOCUMENTS 3,883,273 A 5/1975 King
6,860,724 B2 3/2005 Cho et al.
(Continued)

FOREIGN PATENT DOCUMENTS

JP S48-52008 A 7/1973
JP H08233381 A 9/1996
(Continued)

*Primary Examiner* — Mary Davis
(74) *Attorney, Agent, or Firm* — Harness, Dickey & Pierce, P.L.C.

(57) ABSTRACT

The fluid transfer apparatus includes a rotor housing for forming a fluid compression space having the shape of an epitrochoid surface; a rotor eccentrically rotates inside the fluid compression space by being eccentrically coupled to a rotation shaft; and a rotor housing cover covering the fluid compression space of the rotor housing and including a rotation shaft penetration hole formed at the center of the cover, and a first cover fluid channel and second cover fluid channel are symmetrically formed on the opposite sides of each other with the rotation shaft penetration hole in the middle, wherein a plurality of rotor housing covers are arranged to be spaced apart from each other, one rotor housing is arranged between every two rotor housing covers, one rotor is arranged in the fluid compression space of each
(Continued)

rotor housing, and each rotor is arranged to face a different direction from a neighboring rotor.

23 Claims, 14 Drawing Sheets

(51) Int. Cl.

| | |
|---|---|
| ***F04C 18/22*** | (2006.01) |
| ***F01C 19/10*** | (2006.01) |
| ***F01C 1/22*** | (2006.01) |
| ***F02B 53/00*** | (2006.01) |

(52) U.S. Cl.
CPC ........ *F04C 18/22* (2013.01); *F02B 2053/005* (2013.01); *F04C 2240/20* (2013.01)

(56) References Cited

U.S. PATENT DOCUMENTS

| | | | | |
|---|---|---|---|---|
| 2008/0226480 | A1 | 9/2008 | Ferran et al. | |
| 2015/0167668 | A1 | 6/2015 | Zubenin et al. | |
| 2022/0127997 | A1* | 4/2022 | Koh ........................ | F04C 18/22 |

FOREIGN PATENT DOCUMENTS

| | | | |
|---|---|---|---|
| JP | 2000205148 | A | 7/2000 |
| JP | 6120468 | B1 | 4/2017 |
| KR | 20020023506 | A | 3/2002 |
| KR | 20100091063 | A | 8/2010 |
| KR | 101655160 | B1 | 9/2016 |
| KR | 20170090849 | A | 8/2017 |

* cited by examiner

FLUID TRANSFER APPARATUS WITH A PLURALITY OF ROTOR HOUSINGS ARRANGED AT DIFFERENT ANGULARITY WITH THE NEIGHBORING ROTOR HOUSINGS

CROSS-REFERENCE TO RELATED APPLICATIONS

This application is the National Stage filing under 35 U.S.C. 371 of International Application No. PCT/KR2019/008145, filed on Jul. 3, 2019, which claims the benefit of earlier filing date and right of priority to Korean Application No. 10-2018-0077183 filed on Jul. 3, 2018, the contents of which are all hereby incorporated by reference herein in their entirety.

FIELD

The present disclosure relates to a fluid transfer apparatus capable of transferring fluid bidirectionally.

BACKGROUND ART

Patent Document, Korean Patent Laid-open Publication No. 10-1655160 (Sep. 1, 2016) discloses a rotary piston pump. The rotary piston pump disclosed in the patent document has a rotor housing having an inner circumferential surface in an epitrochoidal shape, and is configured to repeatedly compress and expand a volume variance space of the rotor housing while a rotor rotates eccentrically in an inner space of the rotor housing. In addition, an inflow check valve and an outflow check valve are attached to the rotary piston pump.

The rotary piston pump disclosed in the patent document has advantages in view of transferring a relatively high flow of fluid as well as generating high pressure even though it has a simple structure, compared to previous piston pumps. The rotary piston pump disclosed in the patent document is a positive displacement pump, and airtightness between the rotor housing and the rotor is a very important factor that greatly affects pump performance.

However, the rotary piston pump essentially requires at least a pair of inflow check valves and a pair of outflow check valves to generate pressure. The rotary piston pump has a simple structure, but requires a space for installing a spring, a space for connecting channels, a space for installing a check valve plate or a ball due to the two pairs of check valves. In addition, although the rotary piston pump has the advantage of low noise, the repetitive operation of the check valves causes the generation of minute noise. Further, the rotary piston pump having the check valves can only transfer fluid in one direction, but not in both directions due to the characteristics of the check valves.

Therefore, in order to overcome such disadvantages, it is needed to develop a fluid transfer apparatus having a structure capable of maintaining a high flow of fluid and suction (vacuum) and pressurization functions without check valves, and a fluid transfer apparatus capable of transferring fluid in both directions while implementing miniaturization and low noise through a simpler structure excluding the check valves.

DISCLOSURE

Technical Problems

One aspect of the present disclosure is to provide a fluid transfer apparatus having a structure capable of transferring fluid bidirectionally.

Another aspect of the present disclosure is to provide a fluid transfer apparatus having a structure capable of improving disadvantages of check valves, such as a need for a wide installation space, noise generation, and difficulty in maintenance.

Still another aspect of the present disclosure is to propose a fluid transfer apparatus having a vacuum function to suck in air as well as a compression function to pressurize fluid (water, oil, air).

Still another aspect of the present disclosure is to provide a configuration capable of reducing friction caused on contact surfaces among a rotor, a rotor housing, and a rotor housing cover.

Technical Solution

In order to achieve such an object of the present disclosure, there is provided a fluid transfer apparatus according to an embodiment of the present disclosure which may include a rotor housing defining a fluid compression space having an epitrochoid surface, rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space, and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, and wherein arrangement directions of the rotors are determined based on a direction that centers of the rotors face with respect to the rotation shaft, and each rotor is arranged to face a different direction from those of neighboring rotors thereof.

The first cover channel and the second cover channel may be arranged to have an angle of 180° with each other with respect to the rotation shaft penetration hole on a plane of the rotor housing cover.

Arrangement directions of the rotor housings may be determined based on a direction that an epitrochoid surface faces, and repeated with regularity. Arrangement directions of the rotor housing covers may be determined based on arrangement directions of the first cover channel and the second cover channel with respect to the rotation shaft penetration hole, and repeated with regularity.

The rotor housing may be provided by three or more in number, the rotor housing cover may be provided as many as a number that is one more than the number of rotor housings, and the rotor housing covers and the rotor housings may be alternately disposed.

An arrangement direction of the rotor housing cover may be determined based on an arrangement direction of the first cover channel and the second cover channel with respect to the rotation shaft penetration hole, and the rotor housing cover may be arranged to have an angle of 90° with another neighboring rotor housing cover.

The first cover channel and the second cover channel may be disposed within a range that overlaps an eccentric rotation range of the rotor in a direction parallel to an extending direction of the rotation shaft, and formed through the rotor housing cover such that the fluid compression spaces of two neighboring rotor housings communicate with each other when opened.

Arrangement directions of the rotor housings may be determined based on a direction that the epitrochoid surface faces, and the rotor housings may all be arranged to face the same direction or arranged to have an angle of 90° with the neighboring rotor housings.

The rotor housings may be arranged to have an angle of 90° with the neighboring rotor housings, and the rotors may be arranged to have an angle of 180° with the neighboring rotors.

The rotor housings may all be arranged to face the same direction, and the rotors may be arranged to have an angle of 90° with the neighboring rotors.

The rotor housing may be provided with housing channels formed at positions circumscribed to the epitrochoid surface. The housing channels may be formed to communicate with the fluid compression space, extend in a direction parallel to the extending direction of the rotation shaft, and open toward one of a rotor housing cover on one side thereof and a rotor housing cover on another side.

The housing channels may include a first housing channel opened toward the rotor housing cover on the one side, and a second housing channel opened toward the rotor housing cover on the another side.

The first housing channel may be provided in plurality, symmetrically formed on opposite sides based on the rotation shaft, and the second housing channel may be provided in plurality, symmetrically formed on opposite sides based on the rotation shaft.

An arrangement of the first housing channels when one rotor housing is viewed from the rotor housing cover on the one side may be the same as an arrangement of the second housing channels when the one rotor housing is viewed from the rotor housing cover on the another side.

The housing channels formed in a rotor housing on one side and the housing channels formed in a rotor housing on another side may respectively be disposed at positions not overlapping each other in a direction parallel to the extending direction of the rotation shaft, and the first cover channel and the second cover channel may be formed to connect the housing channels formed in the rotor housing on the one side and the housing channels formed in the rotor housing on the another side.

The rotor housings may be arranged to have an angle of 90° with the neighboring rotor housings, and the first housing channel and the second housing channel is provided by two in number, respectively. When a distance from one of the two first housing channels up to one of the second housing channels along the epitrochoid surface is a first distance, and a distance from the one first housing channel up to another second housing channel is a second distance, one of the first distance and the second distance that passes through an inflection point of the epitrochoid surface may be longer than another that does not pass through the inflection point of the epitrochoid surface The first cover channel and the second cover channel may extend along a circumference smaller than an outer diameter of the rotor housing cover, and extend in a direction toward a relatively close one of two inflection points of the epitrochoid surface.

The rotors may be arranged to have an angle of 180° with the neighboring rotors.

The rotor housings may all be arranged to face the same direction, and the first housing channel and the second housing channel may be provided by two in number, respectively. When a distance from one of the two first housing channels up to one of the second housing channels along the epitrochoid surface is a first distance, and a distance from the one first housing channel up to another second housing channel is a second distance, one of the first distance and the second distance that passes through an inflection point of the epitrochoid surface may be shorter than another that does not pass through the inflection point of the epitrochoid surface.

The first housing channel and the second housing channel may be formed so as not to overlap each other in the direction parallel to the extending direction of the rotation shaft. The first housing channels may be formed to overlap each other in the direction parallel to the extending direction of the rotation shaft, and the second housing channels may be formed to overlap each other in the direction parallel to the extending direction of the rotation shaft.

The first cover channel and the second cover channel may extend along a circumference smaller than an outer diameter of the rotor housing cover, and pass between one of two inflection points of the epitrochoid surface and the outer diameter of the rotor housing cover.

The rotors may be arranged to have an angle of 90° with the neighboring rotors.

The rotors are disposed such that two rotors have an angle of 180° with each other with respect to any one rotor interposed therebetween.

The rotor may be provided with a protrusion protruding along an edge of a surface facing the rotor housing cover.

The rotor may be provided with a protrusion protruding from a surface facing the rotor housing cover. The protrusion may include a first protrusion formed along a circumference smaller than an edge of a surface facing the rotor housing cover, and second protrusions protruding from vertices of the first protrusion toward vertices of the rotor.

Advantageous Effects

According to the present disclosure having the configuration as described above, since the rotor housings and the rotor housing covers are arranged alternately with regularity, an operation may be allowed without a check valve. Therefore, the fluid transfer apparatus of the present disclosure can transfer fluid in both directions. In addition, the present disclosure can solve an installation space required due to check valves, a noise problem due to the installation of the check valves, a maintenance problem of the check valves, a leakage (oil) problem that occurs when the check valves are opened and closed, and the like.

According to the present disclosure, it may be possible to reach a high degree of vacuum faster than the related art rotary vacuum pump. Therefore, the fluid transfer apparatus of the present disclosure can serve as a universal pump with vacuum, self-priming, and pressurization functions, so as to have high utility as a general pump as well as an industrial pump. For example, the fluid transfer apparatus of the present disclosure may be used for various purposes such as a fluid transfer self-priming pump, an air suction water ring pump, a vacuum cleaner also serving as an air compressor, a small air compressor, a nebulizer and the like.

In addition, according to the present disclosure, since the rotor is provided with the protrusion, friction caused on a contact surface between the rotor and the rotor housing cover can be reduced.

MODES FOR CARRYING OUT THE PREFERRED IMPLEMENTATIONS

Hereinafter, a fluid transfer apparatus according to the present disclosure will be described in detail with reference to the drawings.

For the sake of brief description with reference to the drawings, the same or equivalent components will be provided with the same reference numbers, and description thereof will not be repeated.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

1. First Embodiment of Fluid Transfer Apparatus 100

Figure 1:
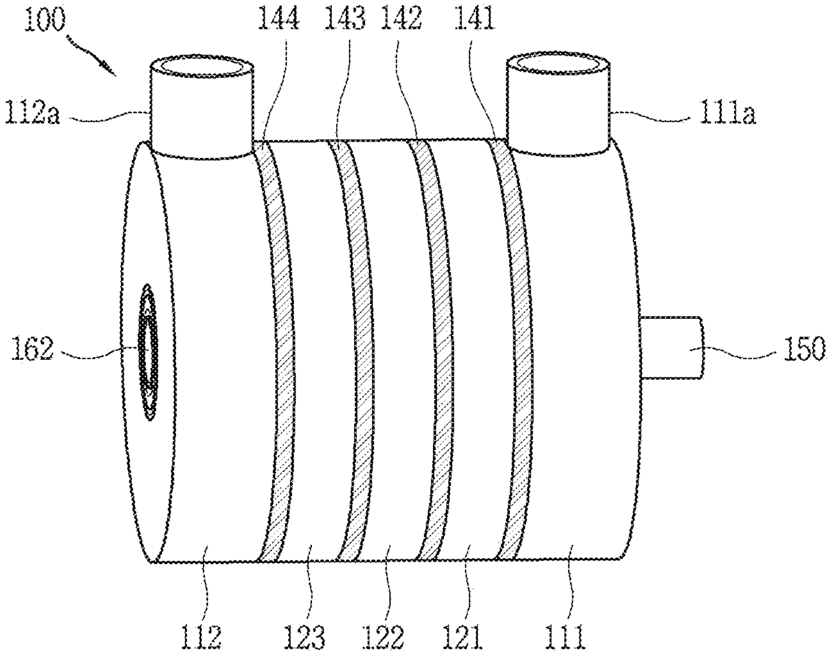
FIG. 1 is a conceptual view illustrating a fluid transfer apparatus in accordance with a first embodiment proposed by the present disclosure.

FIG. 1 is a conceptual view illustrating a fluid transfer apparatus 100 in accordance with a first embodiment proposed by the present disclosure.

The fluid transfer apparatus 100 may have appearance defined by fluid entrance housings 111 and 112, rotor housings 121, 122, and 123, rotor housing covers 141, 142, 143, 144, and a rotation shaft 150. The appearance of the fluid transfer apparatus 100 may be formed in a cylindrical shape as illustrated in FIG. 1, but may not be limited thereto.

From one end to another end of the fluid transfer apparatus 100, a first fluid entrance housing 111, the plurality of rotor housing covers 141, 142, 143, and 144 and rotor housings 121, 122, and 123 which are alternately disposed, and a second fluid entrance housing 112 may be sequentially arranged.

The fluid entrance housings 111 and 112 may be disposed at both ends of the fluid transfer apparatus 100, respectively. The two fluid entrance housings 111 and 112 may define an outer surface of the fluid transfer apparatus 100. The two fluid entrance housings 111 and 112 may be referred to as the first fluid entrance housing 111 and the second fluid entrance housing 112 for distinction.

Fluid entrances 111*a* and 112*a* may be formed at the fluid entrance housings 111 and 112, respectively. The fluid entrances 111*a* and 112*a* may protrude to one side of the fluid entrance housings 111 and 112. FIG. 1 exemplarily illustrates that the fluid entrances 111*a* and 112*a* protrude from outer circumferential surfaces of the fluid entrance housings 111 and 112, respectively.

The fluid transfer apparatus 100 proposed in the present disclosure may transfer fluid in both directions. Accordingly, the two fluid entrances 111*a* and 112*a* may be either a fluid inlet or a fluid outlet depending on a direction of transferring fluid.

The rotor housings 121, 122, and 123 and the rotor housing covers 141, 142, 143, and 144 may be alternately disposed. The rotor housing cover 141, 142, 143, 144 may be provided in plurality, which is disposed to be spaced apart from one another. In addition, the rotor housings 121, 122, and 123 may be disposed between the two neighboring rotor housing covers 141, 142, 143, and 144, respectively.

The rotor housings 121, 122, 123 and the rotor housing covers 141, 142, 143, and 144 may form a continuous outer circumferential surface of the fluid transfer apparatus 100 together with the fluid entrance housings 111 and 112.

The rotor housing covers 141, 142, 143, and 144 may be provided as many as a number that is one more than the number of rotor housings 121, 122, and 123. For example, if the number of rotor housings 121, 122, 123 is n (n is a natural number), the number of rotor housing covers 141, 142, 143, and 144 may be n+1. The minimum value of n for fluid transfer may be 2. Accordingly, the rotor housings 121, 122, 123 may be provided as many as a natural number of 2 or more, and the rotor housing covers 141, 142, 143, and 144 may be provided as many as a natural number of 3 or more.

In FIG. 1, the case of n=3 is shown. A larger number of rotor housings 121, 122, and 123 and a larger number of rotor housing covers 141, 142, 143, 144 may be provided depending on the need for designing the fluid transfer apparatus 100. As the number of n increases more, the fluid transfer apparatus 100 may generate higher pressure.

The rotation shaft 150 may penetrate through the fluid transfer apparatus 100 to be exposed to one side of the fluid transfer apparatus 100. The rotation shaft 150 may be connected to a motor (not shown) to receive rotational driving force from the motor. Wear-resistant bearings and/or retainers 162 for smooth rotation of the rotation shaft 150 may be installed in the fluid entrance housings 111 and 112. The bearing and/or retainer 162 may be formed to surround the rotation shaft 150.

Hereinafter, the internal structure of the fluid transfer apparatus 100 will be described.

Figure 2:
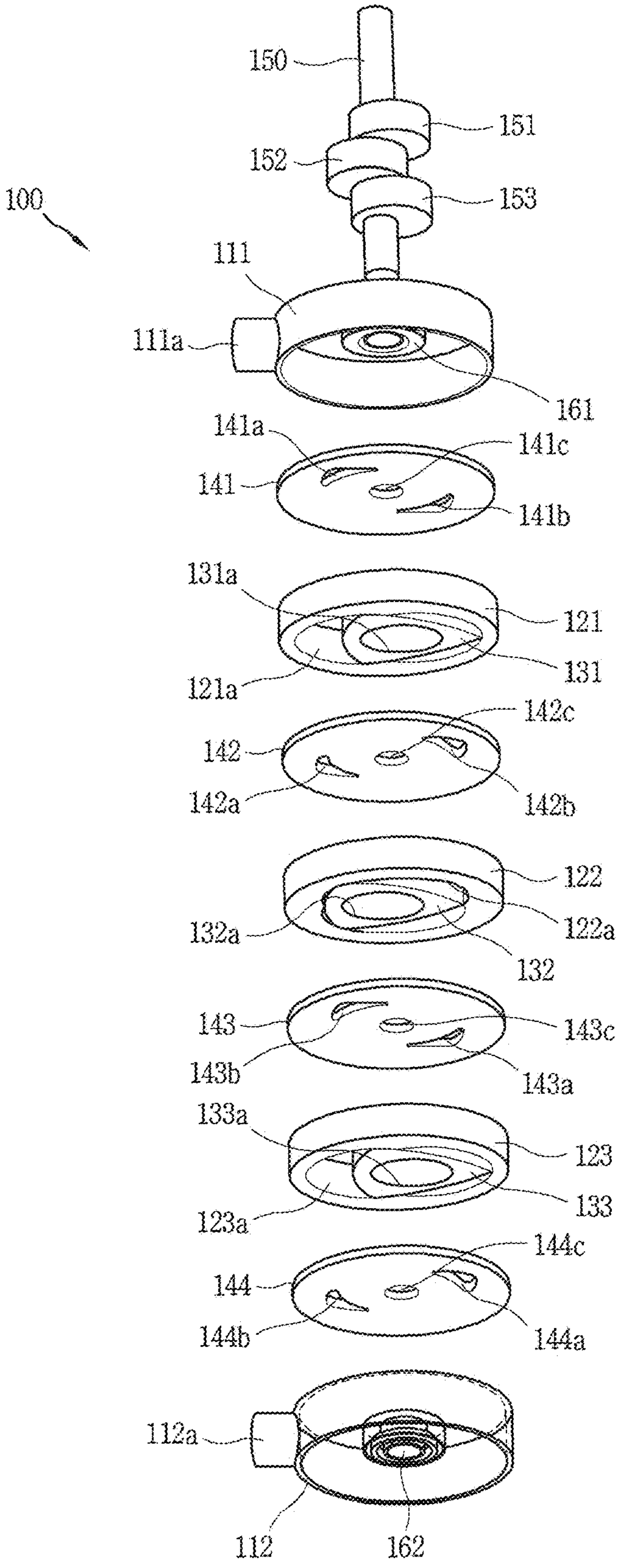
FIG. 2 is an exploded perspective view of the fluid transfer apparatus illustrated in FIG. 1.

FIG. 2 is an exploded perspective view of the fluid transfer apparatus 100 illustrated in FIG. 1.

The fluid entrance housings 111 and 112 may be disposed at both outermost sides of the fluid transfer apparatus 100, respectively. The fluid entrance housings 111 and 112 may define a part of the outer circumferential surface of the fluid transfer apparatus 100 and both side surfaces of the fluid transfer apparatus 100. The both side surfaces may be upper and lower surfaces depending on an installation direction of the fluid transfer apparatus 100.

Each of the fluid entrance housings 111 and 112 may have a cylindrical shape. One surface of the fluid entrance housing 111, 112 may be open, and the opened surface may correspond to one of two bottom surfaces of the cylinder. Accordingly, each of the fluid entrance housings 111 and 112 may have a side surface of the cylinder and an outer wall corresponding to another bottom surface of the cylinder. One (e.g., 141, 144) of the plurality of rotor housing covers 141, 142, 143, and 144 may be disposed on a position corresponding to the opened bottom surface.

The fluid entrances 111*a* and 112*a* may be formed at the fluid entrance housings 111 and 112, respectively. Fluid to be transferred may be introduced into the fluid entrance housings 111 and 112 or discharged out of the fluid entrance housings 111 and 112 through the fluid entrances 111*a* and 112*a*.

The bearings and/or retainers 161 and 162 may be provided on the closed surfaces of the fluid entrance housings 111 and 112, respectively. The bearings and/or retainers 161 and 162 may be disposed to pass through the closed surfaces. Accordingly, the bearings and/or retainers 161 and 162 may be exposed to both of inside and outside of the fluid transfer apparatus 100.

The rotor housing 121, 122, 123 and the rotor housing cover 141, 142, 143, 144 may be provided in plurality. However, the rotor housing covers 141, 142, 143, and 144 may be provided as many as a number that is one more than the number of rotor housings 121, 122, and 123. The rotor housings 121, 122, and 123 may be disposed one by one between the two neighboring rotor housing covers 141, 142, 143, and 144.

Since the rotor housings 121, 122, and 123 and the rotor housing covers 141, 142, 143, and 144 are alternately disposed, the rotor housings 121, 122, and 123 may be spaced apart from one another. The rotor housing covers 141, 142, 143, and 144 may also be spaced apart from one another.

The rotor housings 121, 122, and 123 may create fluid compression spaces 121*a*, 122*a*, and 123*a*. The fluid compression spaces 121*a*, 122*a*, and 123*a* may be open toward the neighboring rotor housing covers 141, 142, 143, and 144 on both sides thereof.

When viewing the rotor housings 121, 122, and 123 from the positions where the rotor housing covers 141, 142, 143, and 144 are disposed, inner circumferential surfaces of the rotor housings 121, 122, and 123 defining the fluid compression spaces 121*a*, 122*a*, and 123*a* may have an epitrochoidal shape. Regions each defined in the epitrochoidal shape may correspond to the fluid compression spaces 121*a*, 122*a*, and 123*a*.

The epitrochoid is a curve traced by a point of a second circle that rolls around the outside of a first circle while being in contact with the first circle. The epitrochoidal shape may vary depending on a size ratio of the first circle and the second circle, and may be shown in various manners. The epitrochoidal shape illustrated in FIG. 2 is in a peanut shape that satisfies the relationship $R=2r$ when the radius of the first circle is $R$ and the radius of the second circle is $r$. Here, a factor 2 may correspond to the number of inflection points (peaks) appearing in the epitrochoidal shape.

Arrangement directions of the rotor housings 121, 122, and 123 may be determined based on a direction that the epitrochoid surface faces. For example, if the epitrochoid surfaces of any two rotor housings overlap each other on a planar view of FIG. 3 to be described later, the two rotor housings may be arranged in the same direction. On the contrary, if the epitrochoid surface of one rotor housing is vertically oriented and the epitrochoid surface of another rotor housing is horizontally oriented, the two rotor housings may be arranged in different directions. The different arrangement directions may be described as having an angle of 90° with each other.

In the present disclosure, the arrangement directions of the rotor housings 121, 122, and 123 may be repeated with regularity. In the fluid transfer apparatus 100 of the first embodiment, the rotor housings 121, 122, and 123 may be arranged to have an angle of 90° with the neighboring rotor housings 121, 122, and 123. Here, the concept of being neighboring does not mean that two rotor housings are in contact with each other but mean that they are spaced apart from each other at the closest distance compared to other rotor housings.

Referring to FIG. 2, the uppermost first rotor housing 121 may be arranged in a horizontal direction, the below second rotor housing 122 may be arranged in a vertical direction, and the lowermost third rotor housing 123 may be arranged in the horizontal direction again.

However, since the arrangement directions of the rotor housings 121, 122, and 123 are relative, the criterion for determining the arrangement directions may arbitrarily vary. For example, even if the criterion for determining the arrangement directions of the rotor housings 121, 122, and 123 is defined as a direction that an imaginary straight line connecting two vertices of the epitrochoid surface faces, the two neighboring rotor housings 121, 122, and 123 in FIG. 2 may still have the arrangement directions forming 90° with each other.

A rotor 131, 132, 133 may be formed in the shape of a triangular pillar. The shape of the rotor 131, 132, 133 may be similar to an equilateral triangular pillar, but its side surface may be understood to be a curved surface having a shape protruding convexly toward an outside of the rotor 131, 132, 133. This curved surface may correspond to the epitrochoid surface of the rotor housing 121, 122, 123.

The rotor 131, 132, 133 may be disposed in the fluid compression space 121*a*, 122*a*, 123*a* to divide the fluid compression space 121*a*, 122*a*, 123*a* of the rotor housing 121, 122, 123 into a plurality of volume variance spaces. The volume is the same term as the capacity of a space accommodating or containing fluid to be compressed. Therefore, the volume variance space means that a volume or capacity is inconstant and varies depending on rotation of the rotor 131, 132, 133.

As the plurality of rotor housings 121, 122, and 123 is provided, the rotor 131, 132, 133 may also be provided in the same number as the number of rotor housings 121, 122, and 123. The rotors 131, 132, and 133 may be disposed one by one in the fluid compression spaces 121*a*, 122*a*, and 123*a* of the respective rotor housings 121, 122, and 123.

As the rotors 131, 132, and 133 are disposed in the fluid compression spaces 121*a*, 122*a*, and 123*a*, respectively, each rotor 131, 132, and 133 may divide the corresponding fluid compression space 121*a*, 122*a*, and 123*a* into three volume variance spaces. And as the rotors 131, 132, and 133 rotate, the three volume variance spaces may change in volume or capacity while repeatedly being compressed and expanded.

The rotors 131, 132, and 133 may be coupled to the rotation shaft 150 so as to rotate together with the rotation shaft 150. The rotation shaft 150 may rotate in place, but the rotors 131, 132, 133 may be eccentrically coupled to the rotation shaft 150. Accordingly, the rotors 131, 132, and 133 may rotate eccentrically in the fluid compression spaces 121*a*, 122*a*, and 123*a*, respectively. Here, the eccentric rotation may mean that the rotor rotates with being eccentrically coupled to the rotation shaft 150.

Accommodating portions 131*a*, 132*a*, 133*a* may be formed in centers of the rotors 131, 132, and 133, respectively, to be opened toward the rotor housing covers 141, 142, 143, and 144 on both sides. The accommodating portions 131*a*, 132*a*, and 133*a* may be spaces for accommodating rotor journals 151, 152, and 153, which will be described later.

The rotation shaft 150 may be inserted through the center of the fluid transfer apparatus 100, and one end thereof may be exposed to the outside of the fluid transfer apparatus 100. One end of the rotation shaft 150 may be connected to a motor that provides rotational driving force.

Rotor journals 151, 152, and 153 may be eccentrically installed on the rotation shaft 150. The rotor journals 151, 152, and 153 may be configured in a cylindrical shape. The rotor journals 151, 152, and 153 may have a height lower than the rotors 131, 132, and 133 in order to provide positions for mounting gears (not shown).

The rotor journals 151, 152, and 153 may be inserted into the accommodating portions 131*a*, 132*a*, and 133*a* of the rotors 131, 132, 133, respectively. The rotor journals 151, 152, and 153 may maintain the eccentric connection state between the rotation shaft 150 and the rotors 131, 132, and 133. Since the rotor journals 151, 152, and 153 are inserted into the centers of the rotors 131, 132, and 133, the centers of the rotor journals 151, 152, and 153 may match (be aligned with) the centers of the rotors 131, 132, and 133. Therefore, the positions of the rotor journals 151, 152, and 153 with respect to the rotation shaft 150 may be substantially the same as the positions of the rotors 131, 132 and 133 with respect to the rotation shaft 150.

When the rotation shaft 150 rotates in place by the rotational driving force applied from the motor, the rotors 131, 132, and 133, which receive the rotational driving force through the gears, may eccentrically rotate within the fluid compression spaces 121*a*, 122*a*, 123*a* of the rotor housings 121, 122, and 123, respectively. When the rotors 131, 132, and 133 rotate eccentrically, the volume variance spaces of the rotor housings 121, 122, and 123 may be repeatedly compressed and expanded.

The arrangement directions of the rotors 131, 132, and 133 may be determined based on directions that the centers of the rotors 131, 132, and 133 faces with respect to the rotation shaft 150. The directions that the centers of the rotor journals 151, 152, 153 face with respect to the rotation shaft 150 may also be the same as the arrangement directions of the rotors 131, 132, and 133.

Each of the rotors 131, 132, and 133 may be arranged to face a different direction from another neighboring rotor 131, 132, and 133. In particular, in the fluid transfer apparatus 100 of the first embodiment, the rotors 131, 132, and 133 may be arranged to have an angle of 180° with the other neighboring rotors 131, 132, and 133. For example, in FIG. 2, the uppermost first rotor 131 and the second rotor 132 immediately below the first rotor 131 may be arranged to face opposite directions to each other. In addition, the lowermost third rotor 133 and the second rotor 132 immediately above the third rotor 133 may be arranged to face opposite directions to each other. In FIG. 2, since the three rotors 131, 132, and 133 are disposed, the uppermost first rotor 131 and the lowermost third rotor 133 may be arranged to face the same direction.

When the fluid transfer apparatus 100 operates, the rotors 131, 132, and 133 may rotate eccentrically. Therefore, the arrangement directions of the rotors 131, 132, and 133 may change in real time. Even if the arrangement directions of the rotors 131, 132, and 133 change in real time, the angle of 180° with the neighboring rotors 131, 132, and 133 may not change. For example, it should be understood that the arrangement directions of the rotors 131, 132, and 133 are not a fixed position relationship but a relative position relationship between the neighboring rotors. The relative position relationship is independent of rotation.

The rotor housing covers 141, 142, 143, and 144 may cover the fluid compression spaces 121*a*, 122*a*, and 123*a* of the rotor housings 121, 122, and 123, respectively. For example, the rotor housing covers 141, 142, 143, and 144 may be formed in a disk shape.

Rotation shaft penetration holes 141*c*, 142*c*, 143*c*, and 144*c* may be formed through the centers of the rotor housing covers 141, 142, 143, and 144, respectively. The rotation shaft 150 may be inserted through the rotation shaft penetration holes 141*c*, 142*c*, 143*c*, and 144*c*.

Cover (fluid) channels 141*a*, 141*b*, 142*a*, 142*b*, 143*a*, 143*b*, 144*a*, and 144*b* may be formed in the rotor housing covers 141, 142, 143, and 144. A plurality of channels may be formed in the fluid transfer apparatus 100. Among the plurality of channels, the cover channels 141*a*, 141*b*, 142*a*, 142*b*, 143*a*, 143*b*, 144*a*, and 144*b* are named to indicate that they are formed in the rotor housing covers 141, 142, 143, and 144.

The cover channels 141*a*, 141*b*, 142*a*, 142*b*, 143*a*, 143*b*, 144*a*, and 144*b* may penetrate through the rotor housing covers 141, 142, 143, and 144 so that the fluid compression spaces 121*a*, 122*a*, and 123*a* of the two adjacent rotor housings 121, 122, and 123 communicate with each other. A direction in which the cover channels 141*a*, 141*b*, 142*a*, 142*b*, 143*a*, 143*b*, 144*a*, and 144*b* penetrate through the rotor housing covers 141, 142, 143, and 144 may be a direction parallel to an extending direction of the rotation shaft 150.

The cover channel 141*a*, 141*b*, 142*a*, 142*b*, 143*a*, 143*b*, 144*a*, 144*b* may be provided in plurality. When one of the cover channels 141*a*, 141*b*, 142*a*, 142*b*, 143*a*, 143*b*, 144*a*, 144*b* is referred to as a first cover channel 141*a*, 142*a*, 143*a*, 144*a* and another one of the cover channels 141*a*, 141*b*, 142*a*, 142*b*, 143*a*, 143*b*, 144*a*, 144*b* is referred to as a second cover channel 141*b*, 142*b*, 143*b*, 144*b*, the first cover channel 141*a*, 142*a*, 143*a*, 144*a* and the second cover channel 141*b*, 142*b*, 143*b*, 144*b* may be symmetrically formed on opposite sides to each other based on the rotation shaft penetration hole 141*c*, 142*c*, 143*c*, 144*c*.

Since the first cover channel 141*a*, 142*a*, 143*a*, 144*a* and the second cover channel 141*b*, 142*b*, 143*b*, 144*b* are located at opposite positions to each other, the first cover channel 141*a*, 142*a*, 143*a*, 144*a* and the second cover channel 141*b*, 142*b*, 143*b*, 144*b* may have an angle of 180° with each other based on the rotation shaft penetration hole 141*c*, 142*c*, 143*c*, 144*c* on the plane of the rotor housing cover 141, 142, 143, 144.

The arrangement direction of the rotor housing cover 141, 142, 143, 144 may be determined based on the arrangement direction of the first cover channel 141*a*, 142*a*, 143*a*, 144*a* and the second cover channel 141*b*, 142*b*, 143*b*, 144*b* based on the rotation shaft penetration hole 141*c*, 142*c*, 143*c*, 144*c*. In addition, the arrangement directions among the rotor housing covers 141, 142, 143, and 144 may repeat with regularity.

For example, in the fluid transfer apparatus 100 of the first embodiment, the rotor housing covers 141, 142, 143, and 144 may be arranged to have an angle of 90° with the other neighboring rotor housing covers 141, 142, 143, and 144. The uppermost first rotor housing cover 141 illustrated in the planar view of FIG. 2 may be disposed to have an angle of 90° with the second rotor housing cover 142 below it. Further, the second rotor housing cover 142 and the third rotor housing cover 143 below the second rotor housing cover 142 may also be arranged to have an angle of 90° with each other. This regularity may be repeated over and over again.

However, since the first cover channel 141*a*, 142*a*, 143*a*, 144*a* and the second cover channel 141*b*, 142*b*, 143*b*, and 144*b* are symmetrical to each other, they may be the same in position and shape. Accordingly, the first rotor housing cover 141 and the third rotor housing cover 143 from the top in FIG. 2 may be viewed as being disposed to have an angle of 180° with each other, but may also be viewed to face the same direction. This is only a difference in explanation, and in any case, the rotor housing covers 141, 142, 143, 144 adjacent to each other may be arranged to have the angle of 90° with each other.

Hereinafter, an opening/closing mechanism of the cover channels 141*a*, 141*b*, 142*a*, 142*b*, 143*a*, 143*b*, 144*a*, and 144*b* formed in the rotor housings 121, 122, and 123 when the rotors rotate will be described.

Figure 3A:
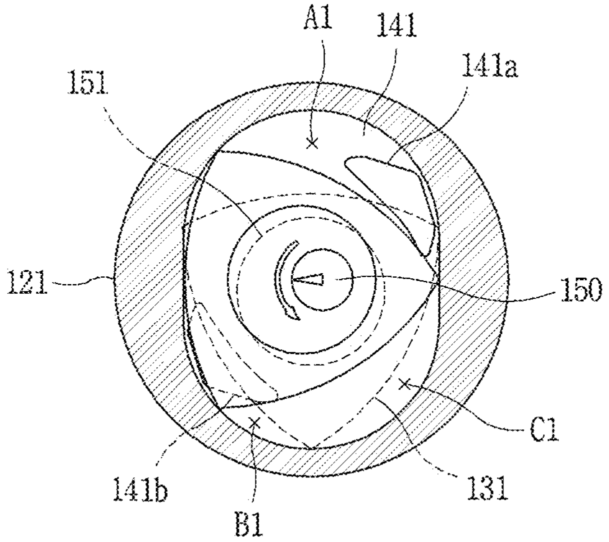
FIGS. 3A and 3B are planar views illustrating a rotor, a rotor housing, and a rotor housing cover of the fluid transfer apparatus illustrated in FIG. 2.
Figure 3B:
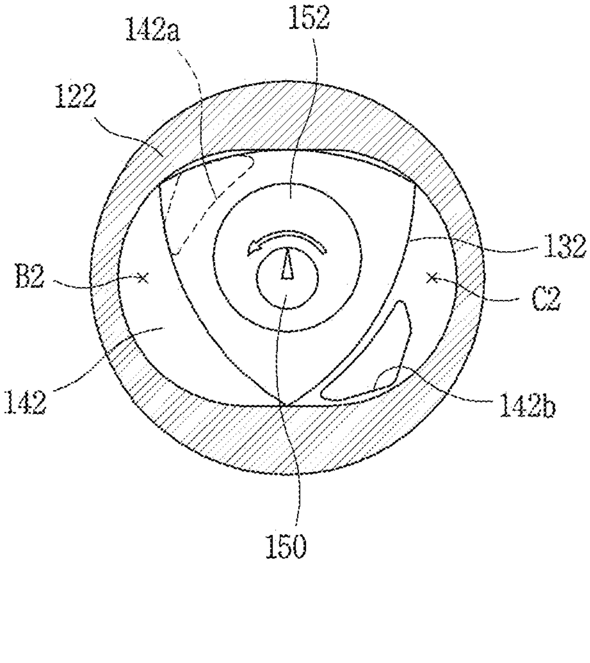

FIGS. 3A and 3B are planar views illustrating the rotors 131 and 132, the rotor housings 121 and 122, and the rotor housing covers 141 and 142 of the fluid transfer apparatus 100 illustrated in FIG. 2. FIGS. 3A and 3B illustrate the two rotor housings 121 and 122 neighboring to each other, the two rotor housing covers 141 and 142 neighboring to each other, and the rotors 131 and 132 disposed in the fluid compression spaces 121*a* and 122*a* of the rotor housings 121 and 122.

The first cover channels 141*a* and 142*a* and the second cover channels 141*b* and 142*b* may be disposed within a range overlapping an eccentric rotation range of the rotors 131 and 132 in the direction parallel to the extending direction of the rotation shaft 150. Since the eccentric rotation range of the rotors 131 and 132 may be the same as the epitrochoid surface of the rotor housings 121 and 122, the first cover channels 141*a* and 142*a* and the second cover channels 141*b* and 142*b* may be formed in the range of the epitrochoid surface in the direction parallel to the extending direction of the rotation shaft 150. Accordingly, the opening and closing of the first cover channels 141*a* and 142*a* and the second cover channels 141*b* and 142*b* may be determined according to the eccentric rotation of the rotors 131 and 132.

In addition, the first cover channels 141*a* and 142*a* and the second cover channels 141*b* and 142*b* may have a shape that can be obscured by the eccentrically rotating rotors 131 and 132. For example, the first cover channels 141*a* and 142*a* and the second cover channels 141*b* and 142*b* may have a pentagonal shape that has the longest bottom side and gets narrow upwardly. In this case, both two sides based on the uppermost vertex may be formed at positions that match the outer circumferential surface of the rotor 131, 132 during the rotation of the rotor 131, 132.

A rotation ratio of the rotation shaft 150 and the rotor 131, 132 may be determined according to the number of gears disposed on the outer circumferential surface of the rotation shaft 150 and the number of gears disposed on the accommodating portion 131*a*, 132*a* of the rotor 131, 132. The rotation ratio of the rotation shaft 150 and the rotor 131, 132 may be 3:1. Therefore, when the rotation shaft 150 rotates three times, the rotor 131, 132 may rotate once.

When the rotor 131, 132 is inserted into the fluid compression space 121*a*, 122*a* of the rotor housing 121, 122, the fluid compression space 121*a*, 122*a* may be divided into a plurality of volume variance spaces. When the rotor 131, 132 in the shape of the triangular pillar is inserted into the fluid compression space 121*a*, 122*a* having the epitrochoid surface in a peanut shape, the fluid compression space 121*a*, 122*a* may be divided into three volume variance spaces.

For convenience of explanation, each volume variance space may be divided into A, B, and C. The volume variance spaces of each of the rotor housings 121 and 122 may be identified by putting a number behind each of the volume variance spaces. For example, the space A of the first rotor housing 121 may be designated as A1. Since the position of the variable-volume pace is identified by the relationship with the outer circumferential surface of the rotor 131, 132, the position of the space may also change when the rotor 131, 132 rotates eccentrically.

As the rotor 131, 132 continuously rotates eccentrically, the three volume variance spaces may be repeatedly compressed and expanded. At this time, the volume change of the three volume variance spaces traces a sinusoidal curve on a graph in which a rotation angle is on a horizontal axis and a volume is on a vertical axis. For example, in FIG. 3A, the space A1 may have the maximum volume before the rotation of the first rotor 131. In addition, as the first rotor 131 rotates in a counterclockwise direction, the volume of the space A1 may gradually decrease. The space A1 may have the minimum volume when the rotation shaft 150 rotates 270°. For reference, the rotor 131, 132 may rotate 90° while the rotation shaft 150 rotates 270°.

Since the volume changes of the volume variance spaces trace the sinusoidal curve, it can be seen that the volume changes are symmetrical to each other based on the maximum value or the minimum value on the graph. For example, as the volume of the space A1 decreases in response to the counterclockwise rotation of the rotation shaft 150, the volume of the space B1 may increase and the volume of the space C1 may decrease. Accordingly, as the rotor 131, 132 rotates, the three volume variance spaces may repeatedly increase and decrease in volume with phase differences.

Hereinafter, the operation of the fluid transfer apparatus 100 will be described.

Figure 4:
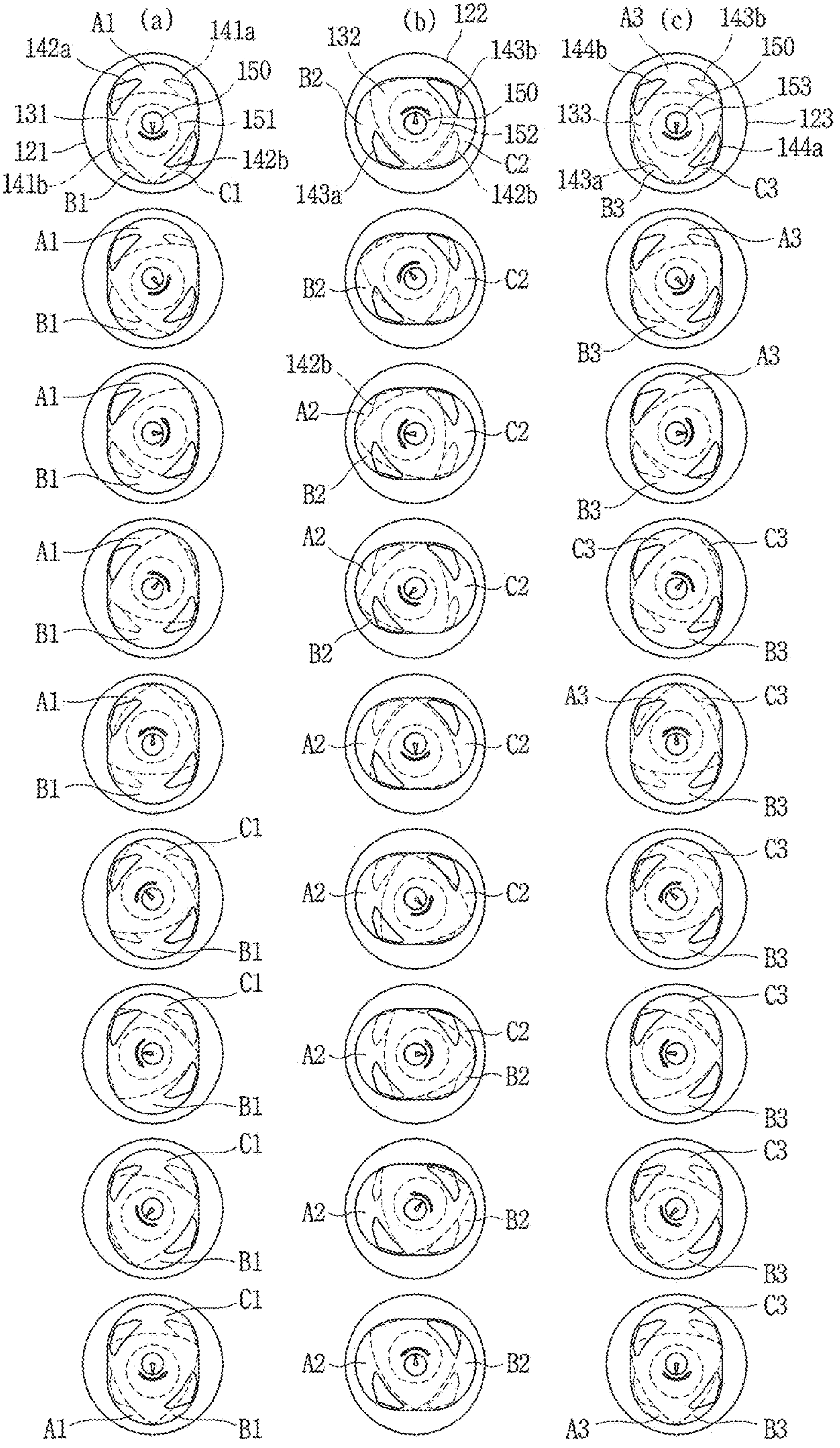
FIG. 4 is a conceptual view sequentially illustrating changes in open/closed states of channels and changes in volumes of volume variance spaces, in response to eccentric rotation of rotors during one-time rotation of a rotation shaft.
Figure 5:
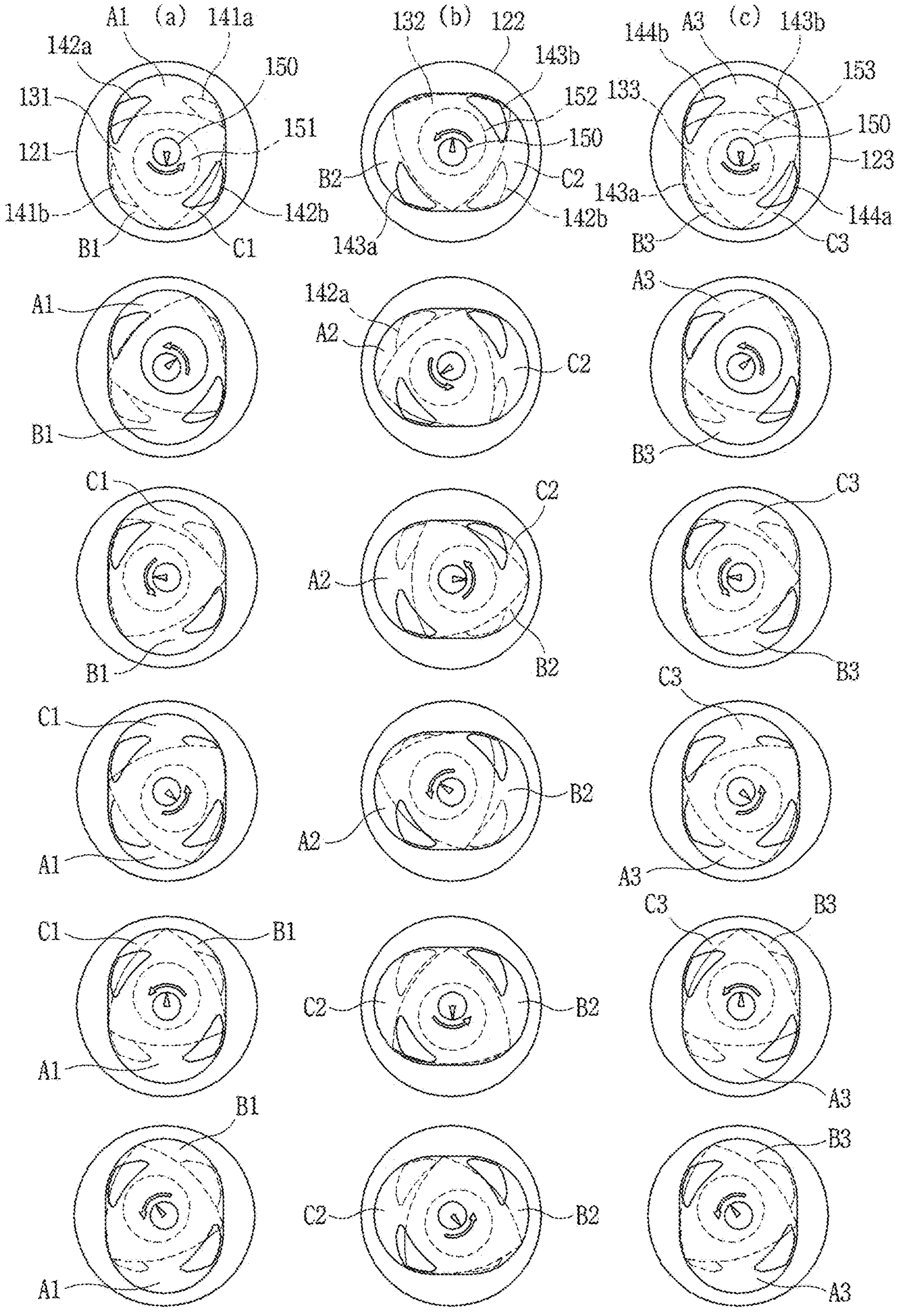
FIG. 5 is a conceptual view sequentially illustrating changes in open/closed states of channels and changes in volumes of volume variance spaces, in response to eccentric rotation of rotors until fluid introduced in the fluid transfer apparatus is discharged out of the fluid transfer apparatus.

FIG. 4 is a conceptual view sequentially illustrating changes in open/closed states of channels and changes in volumes of volume variance spaces, in response to the eccentric rotation of the rotors 131, 132, and 133 during one-time rotation of the rotation shaft 150. FIG. 5 is a conceptual view sequentially illustrating changes in open/closed states of channels and changes in volumes of volume variance spaces, in response to the eccentric rotation of the rotors 131, 132, and 133 until fluid introduced in the fluid transfer apparatus 100 is discharged out of the fluid transfer apparatus 100.

FIGS. 4 and 5 correspond to the fluid transfer apparatus 100 shown in FIG. 2, projected from the top.

Fluid may flow into one of the two fluid entrances 111*a* and 112*a* of the fluid transfer apparatus 100, and compressed fluid may be discharged into another. The opposite case may also be possible. Hereinafter, the configurations illustrated in FIGS. 4 and 5 will be described on the premise that fluid is introduced through the upper fluid entrance 111*a* and discharged through the lower fluid entrance 112*a* based on FIG. 2. In order to distinguish the same components from each other, the upper fluid entrance is referred to as a first fluid entrance 111*a*, and the lower fluid entrance is referred to as a second fluid entrance 112*a*.

Each figure in column (a) is a planar view illustrating the first rotor 131 and the first rotor housing 121, which are the closest to a side in which fluid is introduced, the first rotor housing cover 141 and the second rotor housing cover 142 disposed on both sides of the first rotor housing 121, and the cover channels 141*a*, 141*b*, 142*a*, and 142*b* formed in the two rotor housing covers 141 and 142.

The cover channels indicated by dotted lines in FIGS. 4 and 5 correspond to the cover channels of the rotor housing cover disposed behind the rotor. For example, the first cover channel 141*a* and the second cover channel 141*b* indicated by the dotted lines in row a-1 may be formed in the first rotor housing cover 141 disposed on the rear of the first rotor 131.

And, the cover channels indicated by solid lines in FIGS. 4 and 5 correspond to the cover channels of the rotor housing cover disposed on the front of the rotor. For example, the first cover channel 142*a* and the second cover channel 142*b* indicated by the solid lines in row a-1 may be formed in the second rotor housing cover 142 disposed on the front of the first rotor 131.

Each figure in column (b) is a planar view illustrating the second rotor 132, the second rotor housing 122, the second rotor housing cover 142 and the third rotor housing cover 143 disposed on both sides of the second rotor housing 122, and the cover channels 142*a*, 142*b*, 143*a*, and 143*b* formed in the two rotor housing covers 142 and 143.

Each figure in column (c) is a planar view illustrating the third rotor 133, the third rotor housing 123, the third rotor housing cover 143 and the fourth rotor housing cover 144 disposed on both sides of the third rotor housing 123, and the cover channels 143*a*, 143*b*, 144*a*, and 144*b* formed in the two rotor housing covers 143 and 144.

Vertical columns in FIGS. 4 and 5 are planar views sequentially illustrating the volume changes of the rotor housings 121, 122, and 123, respectively, in response to the rotation of the rotors 131, 132, and 133. The figures illustrated in a row with the same number represent the positions of the rotors 131, 132, and 133 in the same time zone. The rotors 131, 132, 133 rotate counterclockwise.

Hereinafter, description will be given with reference to FIG. 4 first.

Row (1) may correspond to an initial state before the fluid transfer apparatus 100 operates.

The first rotor housing 121 may be arranged to have an angle of 90° with respect to the second rotor housing 122. The second rotor housing 122 may be arranged to have an angle of 90° with respect to the third rotor housing 123.

The first rotor 131 may be arranged to have an angle of 180° with respect to the second rotor 132. The second rotor 132 may be arranged to have an angle of 180° with respect to the third rotor 133.

The first rotor housing cover 141 may be arranged to have an angle of 90° with respect to the second rotor housing cover 142. The second rotor housing cover 142 may be arranged to have an angle of 90° with respect to the third rotor housing cover 143. The third rotor housing cover 143 may be arranged to have an angle of 90° with respect to the fourth rotor housing cover 144.

The rotation ratio of the rotation shaft 150 and each of the rotors 131, 132, and 133 may be 3:1. Therefore, when the rotation shaft 150 and the rotor journals 151, 152, 153 rotate three times, the rotors 131, 132, and 133 may rotate once. Since the rotation shaft 150 rotates once from row (1) to row (9), the rotors 131, 132, and 133 may rotate 120°.

First, explaining column (a) first, the space A1 of the first rotor housing 121 in row (a-1) may have a maximum volume. The first rotor 131 may rotate 90° while the rotation shaft 150 rotates 270° from row (a-1) to row (a-7). And during the process, the space A1 may gradually decrease. The space A1 at the position of the first rotor 131 corresponding to row (a-7) may have a minimum volume. The space A1 may gradually increase again while the rotation shaft 150 rotates further from row (a-7) to row (a-9).

While the position of the first rotor 131 changes from row (a-1) to row (a-9), the space B1 may gradually increase and have a maximum volume at the position of the first rotor 131 corresponding to row (a-5). And while the position of the first rotor 131 changes from row (a-5) to row (a-9), the volume of the space B1 may gradually decrease.

While the position of the first rotor 131 changes from row (a-1) to row (a-9), the space C1 may gradually decrease and then have a minimum volume at the position of the first rotor 131 corresponding to row (a-3). And while the position of the first rotor 131 changes from row (a-3) to row (a-9), the volume of the space C1 may gradually increase again. The space C1 at the position of the first rotor 131 corresponding to row (a-9) may have a maximum volume.

Next, explaining column (b), the space A2 of the second rotor housing 122 may have a minimum volume in row (b-1). The second rotor 132 may rotate 90° while the rotation shaft 150 rotates 270° from row (b-1) to row (b-7). And during the process, the space A2 may gradually increase. The space A2 at the position of the second rotor 132 corresponding to row (b-7) may have a maximum volume. The space A2 may gradually decrease again while the rotation shaft 150 rotates further from row (b-7) to row (b-9).

While the position of the second rotor 132 changes from row (b-1) to row (b-9), the space B2 may gradually decrease and then have a minimum volume at the position of the second rotor 132 corresponding to row (b-5). And while the position of the second rotor 132 changes from row (b-5) to row (b-9), the volume of the space B2 may gradually increase again.

While the position of the second rotor 132 changes from row (b-1) to row (b-9), the space C2 may gradually increase and have a maximum volume at the position of the second rotor 132 corresponding to row (b-3). And while the position of the second rotor 132 changes from row (b-3) to row (b-9), the volume of the space C2 may gradually decrease again. The space C2 at the position of the second rotor 132 corresponding to row (b-9) may have a minimum volume.

The changes in column (c) may be substantially the same as the changes in column (a).

In row (c-1), the space A3 of the third rotor housing 123 has a maximum volume. The third rotor 133 may rotate 90° while the rotation shaft 150 rotates 270° from row (c-1) to row (c-7). And during the process, the space A3 may gradually decrease. The space A3 at the position of the third rotor 133 corresponding to row (c-7) may have a minimum volume. The space A3 may gradually increase again while the rotation shaft 150 rotates further from row (c-7) to row (c-9).

While the position of the third rotor 133 changes from row (c-1) to row (c-9), the space B3 may gradually increase and have a maximum volume at the position of the third rotor 133 corresponding to row (c-5). And while the position of the third rotor 133 changes from row (c-5) to row (c-9), the volume of the space B3 may gradually decrease.

While the position of the third rotor 133 changes from row (c-1) to row (c-9), the space C3 may gradually decrease and then have a minimum volume at the position of the third rotor 133 corresponding to row (c-3). And while the position of the third rotor 133 changes from row (c-3) to row (c-9), the volume of the space C3 may gradually increase again. The space C3 at the position of the third rotor 133 corresponding to row (c-9) may have a maximum volume.

Hereinafter, description will be given with reference to FIG. 5.

The rotation ratio of the rotation shaft 150 and each of the rotors 131, 132, and 133 may be 3:1. Therefore, when the rotation shaft 150 and the rotor journals 151, 152, and 153 rotate three times, the rotors 131, 132, and 133 may rotate once. Since the rotation shaft 150 rotates about 600° from row (1) to row (6), the rotors 131, 132, and 133 may rotate about 200°.

Row (1) may correspond to an initial state before the fluid transfer apparatus 100 operates.

Fluid may flow into the first fluid entrance housing 111 through the first fluid entrance 111*a*. Subsequently, the fluid may flow into the spaces A1 and B1 of the first rotor housing 121 through the first cover channel 141*a* and the second cover channel 141*b* of the first rotor housing cover 141.

The space A1 may gradually decrease as the first rotor 131 rotates from row (1) to row (3), the space A2 may gradually increase as the second rotor 132 rotates from row (1) to row (3). When the first rotor 131 and the second rotor 132 rotate eccentrically to the position of row (3), the space A1 may have a minimum volume and the space A2 may have a maximum volume.

The fluid may flow into the space A2 of the second rotor housing 122 through the first cover channel 142*a* of the second rotor housing cover 142. In this process, there is a time point at which the first cover channel 141*a* of the first rotor housing cover 141 and the first cover channel 142*a* of the second rotor housing cover 142 are simultaneously connected to the space A1. Therefore, there is a possibility that the fluid in the space A1 flows back to the first cover channel 141*a* of the first rotor housing cover 141. However, since the space A2 of the second rotor housing 122 is expanding, the space A2 may become a negative pressure state. Since the space A2 is in the negative pressure state, the fluid in the space A1 may flow into the space A2 without flowing backward.

The volume of the space A2 may gradually decrease again as the second rotor 132 rotates from row (3) to row (5). And, the space A3 may gradually increase as the third rotor 133 rotates. When the second rotor 132 and the third rotor 133 rotates eccentrically to the position of row (5), the space A2 may have a minimum volume and the space A3 may have a maximum volume.

The fluid in the space A2 may flow into the space A3 through the first cover channel 143*a* of the third rotor housing cover 143. In this process, there is a time point at which the first cover channel 142*a* of the second rotor housing cover 142 and the first cover channel 143*a* of the third rotor housing cover 143 are simultaneously connected to the space A2. Therefore, there is a possibility that the fluid in the space A2 flows back to the first cover channel 142*a* of the second rotor housing cover 142. However, since the space A3 of the third rotor housing 123 is expanding, the space A3 may become a negative pressure state. Since the space A3 is in the negative pressure state, the fluid in the space A2 may flow into the space A3 without flowing backward.

When the first rotor 131, the second rotor 132, and the third rotor 133 rotate eccentrically to the position of row (6), the first cover channel 143*a* of the third rotor housing cover 143 and the first cover channel 144*a* of the fourth rotor housing cover 144 are simultaneously connected to the space A3. Also, the first cover channel 142*a* of the second rotor housing cover 142 and the first cover channel 143*a* of the third rotor housing cover 143 may be simultaneously connected to the space C2. In addition, the first cover channel 142*a* of the second rotor housing cover 142 may be connected to the space C1. Therefore, the spaces A3, C2, and C1 may be connected together.

At this time, the space C1 may be in a positive pressure state because it is being compressed and the space C2 may be in a negative pressure state because it is expanding. Since the positive pressure and the negative pressure cancel each other, the fluid in the space A3 in the positive pressure state may be discharged to the second fluid entrance housing 112 through the first cover channel 144*a* of the fourth rotor housing cover 144.

As described above, as the rotors 131, 132, and 133 of the fluid transfer apparatus 100 rotate in a counterclockwise direction, the fluid flowing into the fluid entrance 111*a* on one side of the fluid transfer apparatus 100 may be discharged to the fluid entrance 112*a* on another side through the first cover channels 141*a*, 142*a*, 143*a*, and 144*a* of the respective rotor housing covers 141, 142, 143, and 144 and the fluid compression spaces 121*a*, 122*a*, and 123*a* of the respective rotor housings 121, 122, and 123. An amount of fluid transferred may be directly related to the volume changes of the spaces A, B and C and the rotation of the rotation shaft 150.

The fluid transfer may equally be carried out through the second cover channels 141*b*, 142*b*, 143*b*, and 144*b* of the respective rotor housing covers 141, 142, 143, and 144 and the fluid compression spaces 121*a*, 122*a*, and 123*a* of the respective rotor housings 121, 122, and 123. The volume changes of the spaces B1, B2, and B3 and the volume changes of the spaces C1, C2, and C3 may cause the fluid to flow through the first cover channels 141*a*, 142*a*, 143*a*, and 144*a* and the second cover channels 141*b*, 142*b*, 143*b*, and 144*b* of the respective rotor housing covers 141, 142, 143, and 144.

This fluid transfer method may be applied to a high pressure generator. In addition, unlike the related art rotary piston pump, it may be possible to transfer fluid in a reverse direction through reverse rotation of the rotor. Therefore, the fluid transfer apparatus 100 of the present disclosure may transfer fluid in both directions. In particular, the fluid transfer apparatus 100 of the present disclosure may also be applied to an oil vacuum pump as well as a dry vacuum pump. Since the fluid transfer apparatus 100 of the present disclosure employs a piston type, it may also be applied to a fluid having high viscosity.

2. Second Embodiment of Fluid Transfer Apparatus 200

Hereinafter, a second embodiment of a fluid transfer apparatus 200 will be described.

Figure 6:
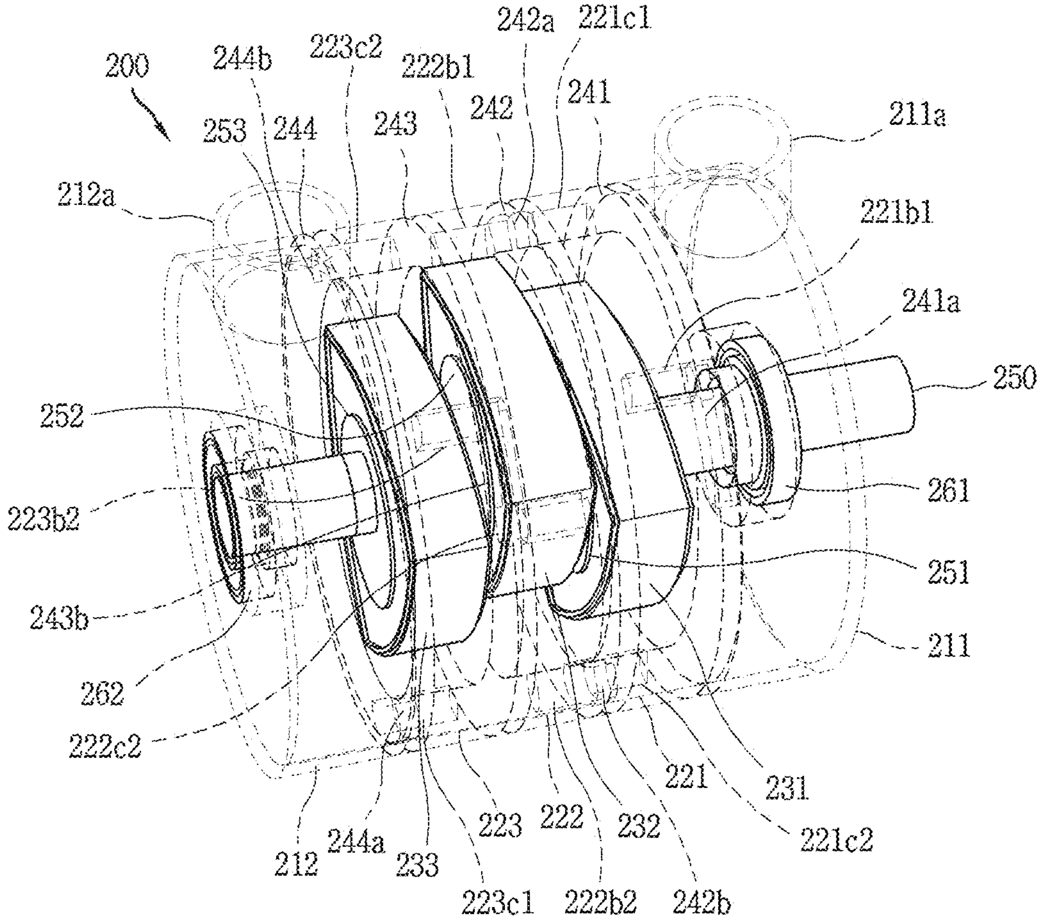
FIG. 6 is a conceptual view illustrating a fluid transfer apparatus in accordance with a second embodiment proposed by the present disclosure.

FIG. 6 is a conceptual view illustrating a fluid transfer apparatus 200 in accordance with a second embodiment proposed by the present disclosure.

The fluid transfer apparatus 200 may have appearance defined by fluid entrance housings 211 and 212, rotor housings 221, 222, and 223, rotor housing covers 241, 242, 243, 244, and a rotation shaft 250. The appearance of the fluid transfer apparatus 200 may be substantially the same as that of the fluid transfer apparatus 100 described in the first embodiment. Accordingly, most of the configurations described in the fluid transfer apparatus 100 of the first embodiment may also be applied to the fluid transfer apparatus 200 of the second embodiment.

However, the second embodiment is different from the first embodiment in view of the formation of housing (fluid) channels **221*b*1, 221*b*2, 221*c*1, 221*c*2, 222*b*1, 222*b*2, 222*c*1, 222*c*2, 223*b*1, 223*b*2, 223*c*1, and 223*c*2 in the rotor housings 221, 222, and 223, and the shapes and positions of the cover channels 241*a*, 241*b*, 242*a*, 242*b*, 243*a*, 243*b*, 244*a*, and 244*b* formed in the rotor housing covers 242, 243, and 244**. Hereinafter, differences from the first embodiment will be described.

In FIG. 6, unexplained reference numeral 251 denotes a first rotor journal, 252 denotes a second rotor journal, 253 denotes a third rotor journal, and 261 and 262 denote bearings and/or retainers.

Figure 7:
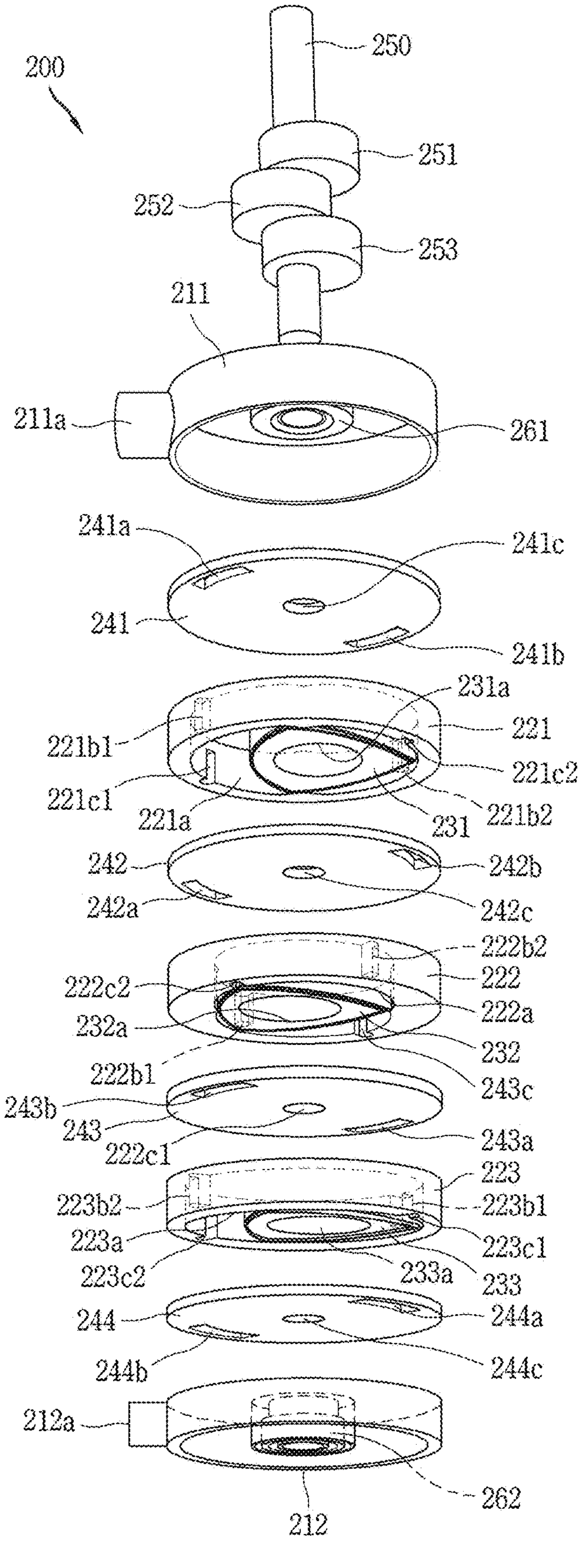
FIG. 7 is an exploded perspective view of the fluid transfer apparatus illustrated in FIG. 6.

FIG. 7 is an exploded perspective view of the fluid transfer apparatus 200 illustrated in FIG. 6.

Arrangement directions among the rotor housings 221, 222, and 223 may be repeated with regularity. In the fluid transfer apparatus 200 of the second embodiment, one of the rotor housings 221, 222, and 223 may be arranged to have an angle of 90° with the neighboring rotor housings 221, 222, and 223.

Referring to FIG. 7, the uppermost first rotor housing 221 may be arranged in a horizontal direction, the second rotor housing 222 below may be arranged in a vertical direction, and the lowermost third rotor housing 223 may be arranged in the horizontal direction again.

Housing channels **221*b*1, 221*b*2, 221*c*1, 221*c*2, 222*b*1, 222*b*2, 222*c*1, 222*c*2, 223*b*1, 223*b*2, 223*c*1, and 223*c*2 may be formed in the rotor housings 221, 222, 223. The housing channels 221*b*1, 221*b*2, 221*c*1, 221*c*2, 222*b*1, 222*b*2, 222*c*1, 222*c*2, 223*b*1, 223*b*2, 223*c*1, and 223*c*2 may be named to indicate that they are formed in the rotor housings 221, 222, and 223, in order to distinguish from the cover channels 241*a*, 241*b*, 242*a*, 242*b*, 243*a*, 243*b*, 244*a*, and 244*b* of the rotor housing covers 241, 242, 243, and 244**.

The housing channels **221*b*1, 221*b*2, 221*c*1, 221*c*2, 222*b*1, 222*b*2, 222*c*1, 222*c*2, 223*b*1, 223*b*2, 223*c*1, and 223*c*2 may be formed at positions circumscribed to the epitrochoid surface. Since the housing channels 221*b*1, 221*b*2, 221*c*1, 221*c*2, 222*b*1, 222*b*2, 222*c*1, 222*c*2, 223*b*1, 223*b*2, 223*c*1, and 223*c*2 are circumscribed to the epitrochoid surface, any boundary may not exist between fluid compression spaces 221*a*, 222*a*, and 223*a* and the housing channels 221*b*1, 221*b*2, 221*c*1, 221*c*2, 222*b*1, 222*b*2, 222*c*1, 222*c*2, 223*b*1, 223*b*2, 223*c*1, and 223*c*2. Accordingly, the housing channels 221*b*1, 221*b*2, 221*c*1, 221*c*2, 222*b*1, 222*b*2, 222*c*1, 222*c*2, 223*b*1, 223*b*2, 223*c*1, and 223*c*2 may be formed to communicate with the fluid compression spaces 221*a*, 222*a*, and 223*a***.

The communication between the housing channels **221*b*1, 221*b*2, 221*c*1, 221*c*2, 222*b*1, 222*b*2, 222*c*1, 222*c*2, 223*b*1, 223*b*2, 223*c*1, and 223*c*2 and the fluid compression spaces 221*a*, 222*a*, and 223*a* may mean that fluid can continuously flow from the fluid compression spaces 221*a*, 222*a*, and 223*a* to the housing channels 222*b*1, 222*b*2, 222*c*1, 222*c*2, 223*b*1, 223*b*2, 223*c*1, and 223*c*2 or from the housing channels 222*b*1, 222*b*2, 222*c*1, 222*c*2, 223*b*1, 223*b*2, 223*c*1, and 223*c*2 to the fluid compression spaces 221*a*, 222*a*, and 223*a***.

The housing channels **221*b*1, 221*b*2, 221*c*1, 221*c*2, 222*b*1, 222*b*2, 222*c*1, 222*c*2, 223*b*1, 223*b*2, 223*c*1, and 223*c*2 may extend along a direction parallel to the extending direction of the rotation shaft 250. The rotor housing covers 241, 242, 243, and 244 may be disposed on both sides of the rotor housings 221, 222, 223, respectively. The housing channels 221*b*1, 221*b*2, 221*c*1, 221*c*2, 222*b*1, 222*b*2, 222*c*1, 222*c*2, 223*b*1, 223*b*2, 223*c*1, and 223*c*2 may have a structure of being open toward one of the two neighboring rotor housing covers 241, 242, 243, and 244** and closed toward another.

The rotor housings 221, 222, and 223 may be provided respectively with first housing channels **221*b*1, 221*b*2, 222*b*1, 222*b*2, 223*b*1, and 223*b*2 that are open toward the rotor housing covers 241, 242, 243, 244 on one side, and second housing channels 221*c*1, 221*c*2, 222*c*1, 222*c*2, 223*c*1 and 223*c*2 that are open toward the rotor housing covers 241, 242, 243, and 244 on another side. The first housing channels 221*b*1, 221*b*2, 222*b*1, 222*b*2, 223*b*1, and 223*b*2 and the second housing channels 221*c*1, 221*c*2, 222*c*1, 222*c*2, 223*c*1, and 223*c*2 may be distinguished according to a direction in which they are open. When viewing the rotor housings 221, 222, and 223 from one of the rotor housing covers 241, 242, 243, and 244, one type of the first housing channels 221*b*1, 221*b*2, 222*b*1, 222*b*2, 223*b*1, and 223*b*2 and the second housing channels 221*c*1, 221*c*2, 222*c*1, 222*c*2, 223*c*1, and 223*c*2 may be visually exposed, and the opposite another type of the housing channels 221*b*1, 221*b*2, 221*c*1, 221*c*2, 222*b*1, 222*b*2, 222*c*1, 222*c*2, 223*b*1, 223*b*2, 223*c*1, and 223*c*2** may be visually obscured.

The first housing channels **221*b*1 and 221*b*2 formed in the first rotor housing 221 may be open toward the first rotor housing cover 241, while being closed toward the second rotor housing cover 242. Conversely, the second housing channels 221*c*1 and 221*c*2 formed in the first rotor housing 221 may be closed toward the first rotor housing cover 241, while being open toward the second rotor housing cover 242**.

The housing channels **221*b*1, 221*b*2, 221*c*1, 221*c*2, 222*b*1, 222*b*2, 222*c*1, 222*c*2, 223*b*1, 223*b*2, 223*c*1, and 223*c*2 may have such structure that is open only in one direction. Accordingly, when the rotor 231, 232, 233 rotates, the fluid introduced into the housing channels 221*b*1, 221*b*2, 221*c*1, 221*c*2, 222*b*1, 222*b*2, 222*c*1, 222*c*2, 223*b*1, 223*b*2, 223*c*1, and 223*c*2 may flow in only one direction. When the rotation direction of the rotor 231, 232, and 233 is reversed, the flow direction of the fluid may also be reversed. The fluid cannot flow in both directions regardless of the rotation direction of the rotor 231, 232, 233**.

The first housing channel **221*b*1, 221*b*2, 222*b*1, 222*b*2, 223*b*1, 223*b*2 may be provided in plurality. For example, two first housing channels 221*b*1, 221*b*2, 222*b*1, 222*b*2, 223*b*1, and 223*b*2 may be formed for each of the rotor housings 221, 222, and 223. The second housing channel 221*c*1, 221*c*2, 222*c*1, 222*c*2, 223*c*1, 223*c*2 may also be provided in plurality. For example, two second housing channels 221*c*1, 221*c*2, 222*c*1, 222*c*2, 223*c*1, 223*c*2 may be formed for each of the rotor housings 221, 222, and 223**.

The arrangement of the first housing channels **221*b*1 and 221*b*2 when viewing the first rotor housing 221 from the first rotor housing cover 241 on its one side may be the same as the arrangement of the second housing channels 221*c*1 and 221*c*2 when viewing the first rotor housing 221 from the second rotor housing cover 242 on its another side. This may also be similar to the second rotor housing 222 and the third rotor housing 223**.

For example, when the first rotor housing 221 is viewed from the first rotor housing cover 241, the first housing channels **221*b*1 and 221*b*2 may be formed at an upper left side and a lower right side of the rotation shaft 250, respectively. Similarly, when the first rotor housing 221 is viewed from the second rotor housing cover 242, the second housing channels 221*c*1 and 221*c*2 may be formed at an upper left side and a lower right side of the rotation shaft 250**, respectively.

On the basis of one of the rotor housing covers 241, 242, 243, and 244, the housing channels **221*b*1, 221*b*2, 221*c*1, 221*c*2, 222*b*1, 222*b*2, 222*c*1, 222*c*2, 223*b*1, 223*b*2, 223*c*1, and 223*c*2 formed in the rotor housing 221, 222, 223 on one side and the housing channels 221*b*1, 221*b*2, 221*c*1, 221*c*2, 222*b*1, 222*b*2, 222*c*1, 222*c*2, 223*b*1, 223*b*2, 223*c*2 formed in the rotor housing 221, 222, 223 on another side may be disposed at positions not overlapping each other in the direction parallel to the extending direction of the rotation shaft 250. At this time, it may be understood that the housing channels 221*b*1, 221*b*2, 221*c*1, 221*c*2, 222*b*1, 222*b*2, 222*c*1, 222*c*2, 223*b*1, 223*b*2, 223*c*1, 223*c*2 disposed at the positions not overlapping each other are open toward the rotor housing cover 241, 242, 243, and 244 located between two rotor housings 221, 222, and 223**.

For example, the second housing channels **221*c*1 and 221*c*2 formed in the first rotor housing 221 may be open toward the second rotor housing cover 242. The first housing channels 222*b*1 and 222*b*2 formed in the second rotor housing 222 may also be open toward the second rotor housing cover 242. The second housing channels 221*c*1 and 221*c*2 formed in the first rotor housing 221 and the first housing channels 222*b*1 and 222*b*2 formed in the second rotor housing 222 may be disposed at positions not overlapping each other in the direction parallel to the extending direction of the rotation shaft 250**.

The cover channels **241*a*, 241*b*, 242*a*, 242*b*, 243*a*, 243*b*, 244*a*, 244*b* formed in the rotor housing covers 241, 242, 243, 244 may allow the housing channels 221*b*1, 221*b*2, 221*c*1, 222*b*2, 222*b*2, 222*c*1, 222*c*2, 223*b*1, 223*b*2, 223*c*1, 223*c*2 formed in the rotor housing 221, 222, 223 on one side to be connected to the housing channels 221*b*1, 221*b*2, 221*c*1, 221*c*2, 222*b*1, 222*b*2, 222*c*1, 222*c*2, 223*b*1, 223*b*2, 223*c*1, 223*c*2 formed in the rotor housing 221, 222, 223** on another side.

For example, the cover channels **242*a* and 242*b* formed in the second rotor housing cover 242 may allow the second housing channels 221*c*1 and 221*c*2 formed in the first rotor housing 221 to be connected to the first housing channels 222*b*1 and 222*b*2 formed in the second rotor housing 222**.

Since the housing channels **221*b*1, 221*b*2, 221*c*1, 221*c*2, 222*b*1, 222*b*2, 222*c*1, 222*c*2, 223*b*1, 223*b*2, 223*c*1, 223*c*2 are formed at positions circumscribed to the epitrochoid surface, the housing channels 221*b*1, 221*b*2, 221*c*1, 221*c*2, 222*b*1, 222*b*2, 222*c*1, 222*c*2, 223*b*1, 223*b*2, 223*c*1, 223*c*2 may be formed outside the eccentric rotation range of the rotors 231, 232, 233 in the direction parallel to the extending direction of the rotation shaft 250. The cover channels 241*a*, 241*b*, 242*a*, 242*b*, 243*a*, 243*b*, 244*a*, 244*b* should also be formed outside the eccentric rotation range of the rotors 231, 232, 233 in order to connect the housing channels 221*b*1, 221*b*2, 221*c*1, 221*c*2, 222*b*1, 222*b*2, 222*c*1, 222*c*2, 223*b*1, 223*b*2, 223*c*1, 223*c*2** on both sides.

Each of the rotors 231, 232, and 233 may be arranged to face a different direction from the other neighboring rotors 231, 232, and 233. In particular, in the fluid transfer apparatus 200 of the second embodiment, the rotors 231, 232, and 233 may be arranged to have 180° with the other neighboring rotors 231, 232, and 233.

For example, in FIG. 7, the uppermost first rotor 231 and the second rotor 232 immediately below the first rotor 131 may be arranged to face opposite directions to each other. In addition, the lowermost third rotor 233 and the second rotor 232 immediately above the third rotor 133 may be arranged to face opposite directions to each other. In FIG. 7, since the three rotors 231, 232, and 233 are disposed, the lowermost third rotor 233 and the uppermost first rotor 231 may be arranged to face the same direction.

The first cover channel **141*a*, 142*a*, 143*a*, 144*a* and the second cover channel 141*b*, 142*b*, 143*b*, 144*b* may have an angle of 180° with each other based on the rotation shaft penetration hole 141*c*, 142*c*, 143*c*, 144*c* on the plane of the rotor housing cover 141, 142, 143, 144**.

In the fluid transfer apparatus 200 of the second embodiment, the rotor housing covers 241, 242, 243, and 244 may be arranged to have an angle of 90° with the other neighboring rotor housing covers 241, 242, 243, and 244. The uppermost first rotor housing cover 241 illustrated in the planar view of FIG. 7 may be disposed to have an angle of 90° with the second rotor housing cover 242 below it. Further, the second rotor housing cover 242 and the blow third rotor housing cover 243 may also be arranged to have an angle of 90° with each other. This regularity may be repeated over and over again.

However, since the first cover channels **241*a*, 242*a*, 243*a*, and 244*a* and the second cover channels 241*b*, 242*b*, 243*b*, and 244*b* are symmetrical to each other, they may be the same in position and shape. Accordingly, the first rotor housing cover 241 and the third rotor housing cover 243 in FIG. 7 may be viewed as being disposed to have an angle of 180° with each other, but may also be viewed to face the same direction. This is only a difference in explanation, and in any case, the rotor housing covers 241, 242, 243, and 244** adjacent to each other may be arranged to have the angle of 90° with each other.

In FIG. 7, unexplained reference numerals **221*a*, 222*a*, and 223*a* denote fluid compression spaces, and 231*a*, 232*a*, and 233*a*** denote accommodating portions.

Figure 8:
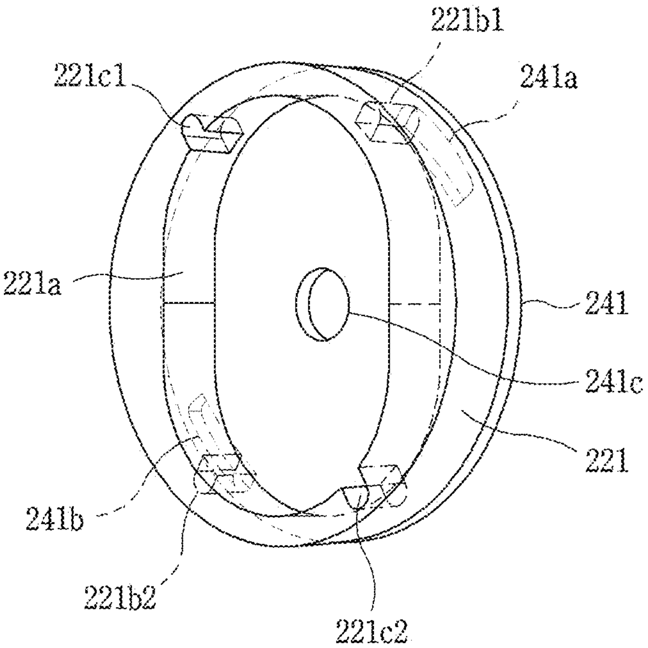
FIG. 8 is a perspective view illustrating a first rotor housing and a first rotor housing cover of the fluid transfer apparatus illustrated in FIG. 7.

FIG. 8 is a perspective view illustrating the first rotor housing 221 and the first rotor housing cover 241 of the fluid transfer apparatus 200 illustrated in FIG. 7.

The two first housing channels **221*b*1 and 221*b*2 may be symmetrically formed on opposite sides based on the rotation shaft 250. When the epitrochoid surface in the peanut shape is divided into two semicircles by connecting two inflection points formed on the epitrochoid surface, the two first housing channels 221*b*1 and 221*b*2** may be formed in the different semicircles.

The two second housing channels **221*c*1 and 221*c*2 may be symmetrically formed on opposite sides based on the rotation shaft 250. When the epitrochoid surface is divided into two semicircles by connecting two inflection points formed on the epitrochoid surface in the peanut shape, the two second housing channels 221*c*1 and 221*c*2** may be formed in the different semicircles.

When a distance from one (e.g., 221*b*1) of the two first housing channels 221*b*1 and 221*b*2 up to one (e.g., 221*c*2) of the two second housing channels 221*c*1 and 221*c*2 along the epitrochoid surface is a first distance and a distance from the one 221*b*1 up to another one 221*c*1 along the epitrochoid surface is a second distance, one (e.g., 221*b*1 to 221*c*2) of the first distance and the second distance may pass through the inflection point of the epitrochoid surface. On the other hand, another one (221*b*1 to 221*c*1) of the first distance and the second distance may not pass through the inflection point of the epitrochoid surface.

At this time, the one of the first distance and the second distance passing through the inflection point of the epitrochoid surface may be longer than the another one not passing through the inflection point of the epitrochoid surface. For example, a distance from one (e.g., 221*b*1) of the two first housing channels 221*b*1 and 221*b*2 up to the second housing channel 221*c*1 located in the same semicircle may be shorter than a distance from the one (e.g., 221*b*1) up to the second housing channel 221*c*2 located in a different semicircle.

This description may be equally applied to a first distance and a second distance based on the another one (e.g., 221*b*2) of the two first housing channels 221*b*1 and 221*b*2. Similarly, this description may be applied to distances from one of the two second housing channels 221*c*1 and 221*c*2 to the two first housing channels 221*b*1 and 221*b*2.

The cover channels 241*a* and 241*b* formed in the first rotor housing cover 241 may extend along a circumference smaller than an outer diameter of the first rotor housing cover 241. The cover channels 241*a* and 241*b* may extend in a direction toward a relatively close one of the two inflection points of the epitrochoid surface.

Hereinafter, the operation of the fluid transfer apparatus 200 will be described.

Figure 9:
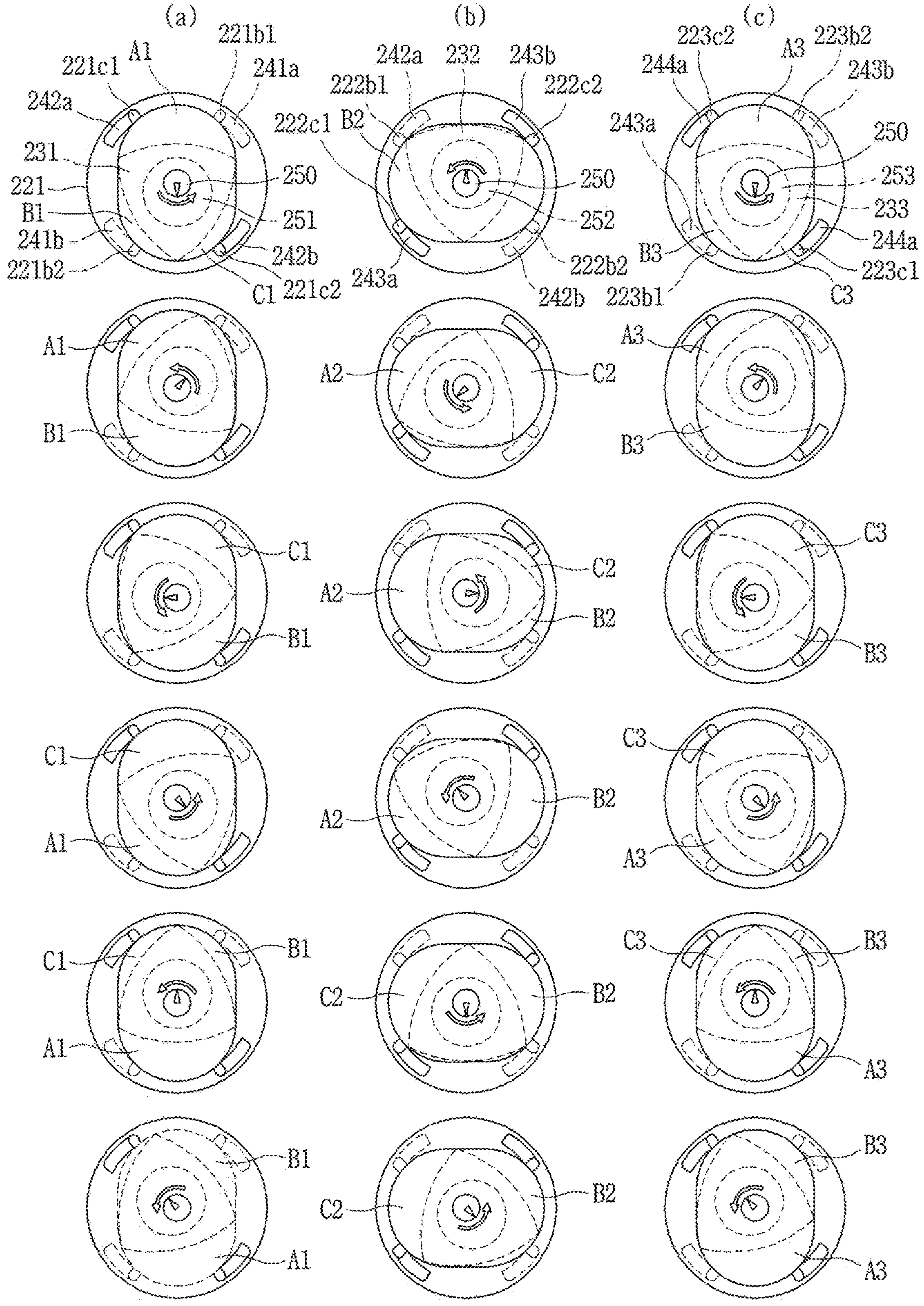
FIG. 9 is a conceptual view sequentially illustrating changes in open/closed states of channels and changes in volumes of volume variance spaces.

FIG. 9 is a conceptual view sequentially illustrating changes in open/closed states of channels and changes in volumes of volume variance spaces, in response to eccentric rotation of the rotors 231, 232, and 233.

FIG. 9 corresponds to the fluid transfer apparatus 200 illustrated in FIG. 7, projected from the bottom.

Fluid may flow into one of the two fluid entrances 211*a* and 212*a* of the fluid transfer apparatus 200, and compressed fluid may be discharged into another. The opposite case may also be possible. Hereinafter, the configurations illustrated in FIG. 9 will be described on the premise that fluid is introduced through the upper fluid entrance 211*a* and discharged through the lower fluid entrance 212*a* based on FIG. 7. In order to distinguish the same components from each other, the upper fluid entrance is referred to as a first fluid entrance 211*a*, and the lower fluid entrance is referred to as a second fluid entrance 212*a*.

Each figure in column (a) is a planar view illustrating the first rotor 231, the first rotor housing 221, and the cover channels 241*a*, 241*b*, 242*a*, and 242*b* of the first rotor housing cover 241 and the second rotor housing cover 242 disposed on both sides of the first rotor housing 221.

Each figure in column (b) is a planar view illustrating the second rotor 232, the second rotor housing 222, and the cover channels 242*a*, 242*b*, 243*a*, and 243*b* of the second rotor housing cover 242 and the third rotor housing cover 243 disposed on both sides of the second rotor housing 222.

Each figure in column (c) is a planar view illustrating the third rotor 233, the third rotor housing 223, and the cover channels 243*a*, 243*b*, 244*a*, and 244*b* of the third rotor housing cover 243 and the fourth rotor housing cover 244 disposed on both sides of the third rotor housing 223.

The cover channels indicated by dotted lines indicate the cover channels of the rotor housing cover disposed on the rear of the rotor. For example, the first cover channel 241*a* and the second cover channel 241*b* indicated by the dotted lines in row a-1 may be formed in the first rotor housing cover 241 disposed on the rear of the first rotor 231.

And, the cover channels indicated by solid lines indicate the cover channels of the rotor housing cover disposed on the front of the rotor. For example, the first cover channel 242*a* and the second cover channel 242*b* indicated by the solid lines in row a-1 may be formed in the second rotor housing cover 242 disposed on the front of the first rotor 231.

The first rotor housing 221 may be arranged to have an angle of 90° with respect to the second rotor housing 222. The second rotor housing 222 may be arranged to have an angle of 90° with respect to the third rotor housing 223.

The first rotor 231 may be arranged to have an angle of 180° with respect to the second rotor 232. The second rotor 232 may be arranged to have an angle of 180° with respect to the third rotor 233.

The first rotor housing cover 241 may be arranged to have an angle of 90° with respect to the second rotor housing cover 242. The second rotor housing cover 242 may be arranged to have an angle of 90° with respect to the third rotor housing cover 243. The third rotor housing cover 243 may be arranged to have an angle of 90° with respect to the fourth rotor housing cover 244.

The rotation ratio of the rotation shaft 250 and each of the rotors 231, 232, and 233 may be 3:1. Therefore, when the rotation shaft 250 rotates three times, the rotors 231, 232, and 233 may rotate once. Since the rotation shaft 250 rotates about 600° from row (1) to row (6), the rotors 231, 232, and 233 may rotate about 200°.

Row (1) may correspond to an initial state before the fluid transfer apparatus 200 operates.

Fluid may flow into the first fluid entrance housing 211 through the first fluid entrance 211*a*. Subsequently, the fluid may flow into the space A1 through the first cover channel 241*a* of the first rotor housing cover 241 and the first housing channel 221*b*1 of the first rotor housing 221. In addition, the fluid may flow into the space B1 through the second cover channel 241*b* of the first rotor housing cover 241 and the different first housing channel 221*b*2 of the first rotor housing 221.

The space A1 may gradually decrease as the first rotor 231 rotates from row (1) to row (3), and the space A2 may gradually increase as the second rotor 232 rotates from row (1) to row (3). When the first rotor 231 and the second rotor 232 rotate eccentrically to the position of row (3), the space A1 may have a minimum volume and the space A2 may have a maximum volume.

The fluid in the space A1 may flow into the space A2 through the second housing channel 221*c*1 of the first rotor housing 221, the first cover channel 242*a* of the second rotor housing cover 242, and the first housing channel 222*b*1 of the second rotor housing 222.

In this process, there is a time point at which the first cover channel 241*a* of the first rotor housing cover 241 and the first cover channel 242*a* of the second rotor housing 222 are simultaneously connected to the space A1. Therefore, there is a possibility that the fluid in the space A1 flows back to the first cover channel 241*a* of the first rotor housing cover 241. However, since the space A2 of the second rotor housing 222 is expanding, the space A2 may become a negative pressure state. Since the space A2 is in the negative pressure state, the fluid in the space A1 may flow into the space A2 without flowing backward.

The volume of the space A2 may gradually decrease again as the second rotor 232 eccentrically rotates from row (3) to row (5). And, the space A3 may gradually increase as the third rotor 233 eccentrically rotates. When the second rotor 232 and the third rotor 233 rotates eccentrically to the position of row (5), the space A2 may have a minimum volume and the space A3 may have a maximum volume.

The fluid in the space A2 may flow into the space A3 through the second housing channel 222*c*1 of the second rotor housing 222, the first cover channel 243*a* of the third rotor housing cover 243, and the first housing channel 223*b*1 of the third rotor housing 223. In this process, there is a time point at which the first cover channel 242*a* of the second rotor housing cover 242 and the first cover channel 243*a* of the third rotor housing cover 243 are simultaneously connected to the space A2. Therefore, there is a possibility that the fluid in the space A2 flows back to the first cover channel 242*a* of the second rotor housing cover 242. However, since the space A3 of the third rotor housing 223 is expanding, the space A3 may become a negative pressure state. Since the space A3 is in the negative pressure state, the fluid in the space A2 may flow into the space A3 without flowing backward.

When the first rotor 231, the second rotor 232, and the third rotor 233 rotate eccentrically to the position of row (6), the first cover channel 243*a* of the third rotor housing cover 243 and the first cover channel 244*a* of the fourth rotor housing cover 244 are simultaneously connected to the space A3. Also, the first cover channel 242*a* of the second rotor housing cover 242 and the first cover channel 243*a* of the third rotor housing cover 243 may be simultaneously connected to the space C2. In addition, the first cover channel 242*a* of the second rotor housing cover 242 may be connected to the space C1. Therefore, the spaces A3, C2, and C1 may be connected together.

At this time, the space C1 may be in a positive pressure state because it is being compressed and the space C2 may be in a negative pressure state because it is expanding. Since the positive pressure and the negative pressure cancel each other, the fluid in the space A3 in the positive pressure state may be discharged to the second fluid entrance housing 212 through the first cover channel 244*a* of the fourth rotor housing cover 244.

As described above, as the rotors 231, 232, and 233 of the fluid transfer apparatus 200 rotate in the counterclockwise direction, the fluid flowing into the fluid entrance 211*a* on one side of the fluid transfer apparatus 100 may be discharged to the fluid entrance 212*a* on another side through the first cover channels 241*a*, 242*a*, 243*a*, and 244*a* of the respective rotor housing covers 241, 242, 243, and 244 and the fluid compression spaces 221*a*, 222*a*, and 223*a* of the respective rotor housings 221, 222, and 223. An amount of fluid transferred may be directly related to the volume changes of the spaces A, B and C of the respective rotor housings 221, 222, and 223 and the rotation of the rotation shaft 250.

The fluid transfer may equally be carried out through the second cover channels 241*b*, 242*b*, 243*b*, and 244*b* of the respective rotor housing covers 241, 242, 243, and 244 and the fluid compression spaces 221*a*, 222*a*, and 223*a* of the respective rotor housings 221, 222, and 223. The volume changes of the spaces B1, B2, and B3 and the volume changes of the spaces C1, C2, and C3 may cause the fluid to flow through the first cover channels 241*a*, 242*a*, 243*a*, and 244*a* and the second cover channels 241*b*, 242*b*, 243*b*, and 244*b* of the respective rotor housing covers 241, 242, 243, and 244.

3. Third Embodiment of Fluid Transfer Apparatus 300

Hereinafter, a third embodiment of a fluid transfer apparatus 300 will be described.

Figure 10:
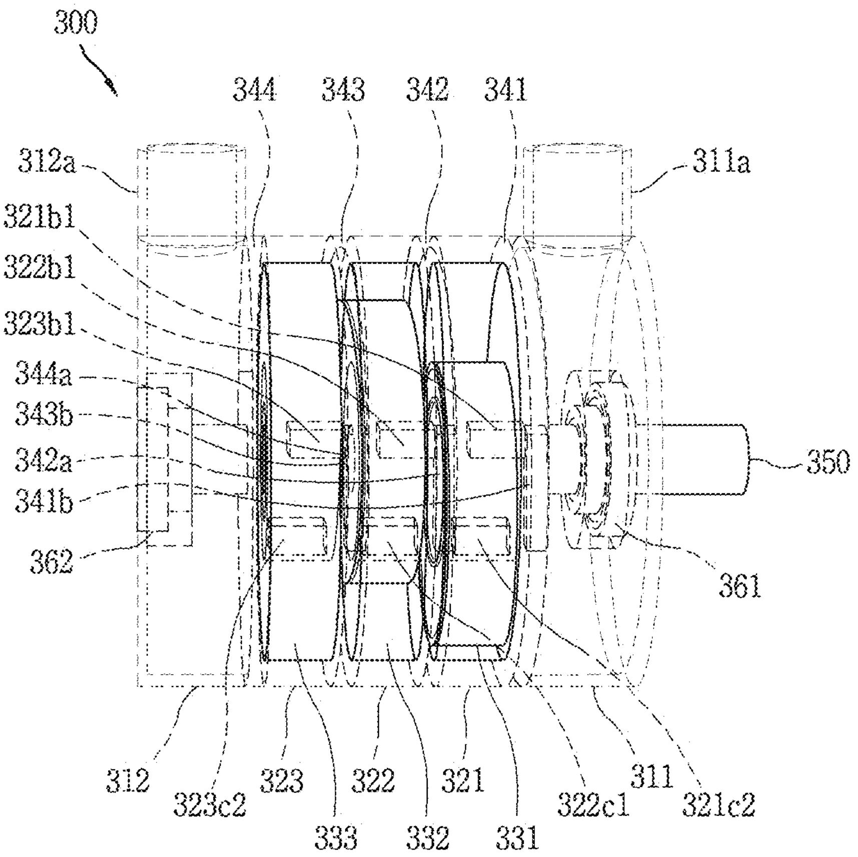
FIG. 10 is a conceptual view illustrating a fluid transfer apparatus in accordance with a third embodiment proposed by the present disclosure.

FIG. 10 is a conceptual view illustrating a fluid transfer apparatus 300 in accordance with a third embodiment proposed by the present disclosure.

The fluid transfer apparatus 300 may have appearance defined by fluid entrance housings 311 and 312, rotor housings 321, 322, and 323, rotor housing covers 341, 342, 343, 344, and a rotation shaft 350. The appearance of the fluid transfer apparatus 300 may be substantially the same as that of the fluid transfer apparatus 200 described in the second embodiment. Accordingly, most of the configurations described in the fluid transfer apparatus 200 of the second embodiment may also be applied to the fluid transfer apparatus 300 of the third embodiment.

However, the arrangements of the rotor housings 321, 322, and 323, the positions of the housing channels 321*b*1, 321*b*2, 321*c*1, 321*c*2, 322*b*1, 322*b*2, 322*c*1, 322*c*2, 323*b*1, and 323*b*2 formed in the rotor housings 321, 322, and 323, and the arrangements of the rotors 331, 332, and 333 may be different from those in the second embodiment. Hereinafter, differences from the second embodiment will be described.

In FIG. 10, unexplained reference numerals 361 and 362 denote bearings and/or retainers.

Figure 11:
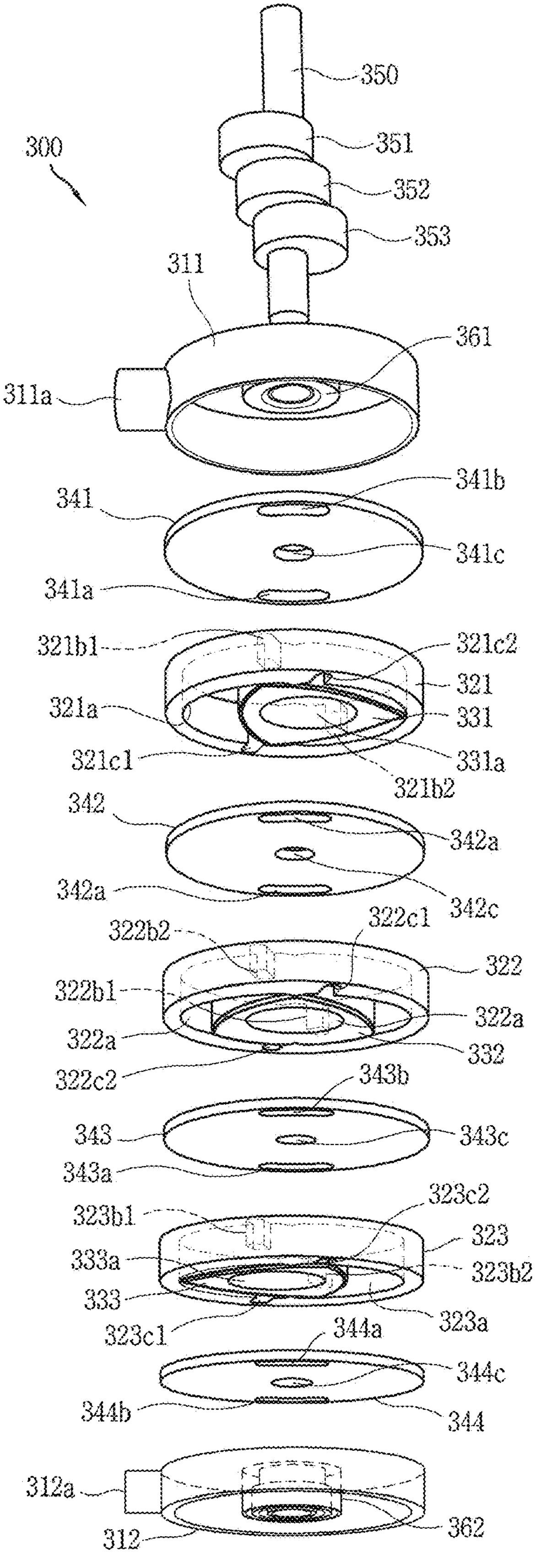
FIG. 11 is an exploded perspective view of the fluid transfer apparatus illustrated in FIG. 10.

FIG. 11 is an exploded perspective view of the fluid transfer apparatus 300 illustrated in FIG. 10.

The arrangement directions among the rotor housings 321, 322, and 323 may be repeated with regularity. In the fluid transfer apparatus 300 of the third embodiment, the plurality of rotor housings 321, 322, and 323 may all be arranged to face the same direction. Referring to FIG. 11, it can be seen that the first rotor housing 321, the second rotor housing 322, and the third rotor housing 323 are all arranged to face a horizontal direction.

Housing channels 321*b*1, 321*b*2, 321*c*1, 321*c*2, 322*b*1, 322*b*2, 322*c*1, 322*c*2, 323*b*1, 323*b*2, 323*c*1, and 323*c*2 may be formed in the rotor housings 321, 322, 323. The housing channels 321*b*1, 321*b*2, 321*c*1, 321*c*2, 322*b*1, 322*b*2, 322*c*1, 322*c*2, 323*b*1, 323*b*2, 323*c*1, and 323*c*2 may be formed at positions circumscribed to the epitrochoid surface. The first housing channel 321*b*1, 321*b*2, 322*b*1, 322*b*2, 323*b*1, 323*b*2 and the second housing channel 321*c*1, 321*c*2, 322*c*1, 322*c*2, 323*c*1, 323*c*2 may be provided in plurality. For example, each of the rotor housings 321, 322, and 323 may be provided with two first housing channels 321*b*1, 321*b*2, 322*b*1, 322*b*2, 323*b*1, 323*b*2 and two second housing channels 321*c*1, 321*c*2, 322*c*1, 322*c*2, 323*c*1, 323*c*2.

Based on one rotor housing 321, 322, 323, the first housing channels 321*b*1, 321*b*2, 322*b*1, 322*b*2, 323*b*1, 323*b*2 and the second housing channels 321*c*1, 321*c*2, 322*c*1, 322*c*2, 323*c*1, 323*c*2 may be formed at positions not overlapping each other in the direction parallel to the extending direction of the rotation shaft 350. In addition, the first housing channels 321*b*1, 321*b*2, 322*b*1, 322*b*2, 323*b*1, 323*b*2 and the second housing channels 321*c*1, 321*c*2,

322*c*1, 322*c*2, 323*c*1, 323*c*2 formed in the different rotor housings 321, 322, 323 may be formed at positions not overlapping each other.

In contrast, the first housing channels 321*b*1, 321*b*2, 322*b*1, 322*b*2, 323*b*1, 323*b*2 formed in the different rotor housings 321, 322, 323 may be formed to overlap each other in the extending direction of the rotation shaft 350. And the second housing channels 321*c*1, 321*c*2, 322*c*1, 322*c*2, 323*c*1, 323*c*2 formed in the different rotor housings 321, 322, 323 may also be formed to overlap each other in the extending direction of the rotation shaft 350.

Each of the rotors 331, 332, and 333 may be arranged to have an angle of 90° with the different rotors 331, 332, and 333. The first rotor 331 and the second rotor 332 may be arranged to have an angle of 90° with each other. Also, the second rotor 332 and the third rotor 333 may be arranged to have an angle of 90° with each other. The arrangement directions of the rotors 331, 332, and 333 may have regularity. Therefore, based on one of the rotors 331, 332, and 333, a rotor 331, 332, 333 at one side and another rotor 331, 332, 333 at another side may be arranged to have an angle of 180° with each other. For example, the first rotor 331 at one side of the second rotor 332 and the third rotor 333 at another side of the second rotor 332 may be arranged to have an angle of 180° with each other.

The cover channels 341*a*, 341*b*, 342*a*, 342*b*, 343*a*, 343*b*, 344*a*, 344*b* formed in the rotor housing cover 341, 342, 343, 344 may allow the housing channels 321*b*1, 321*b*2, 321*c*1, 322*b*2, 322*b*2, 322*c*1, 322*c*2, 323*b*1, 323*b*2, 323*c*1, 323*c*2 formed in the rotor housing 321, 322, 323 on one side to be connected to the housing channels 321*b*1, 321*b*2, 321*c*1, 321*c*2, 322*b*1, 222*b*2, 322*c*1, 322*c*2, 323*b*1, 323*b*2, 323*c*1, 323*c*2 formed in the rotor housing 321, 322, 323 on another side.

For example, the cover channels 342*a* and 342*b* formed in the second rotor housing cover 342 may allow the second housing channels 321*c*1 and 321*c*2 formed in the first rotor housing 321 to be connected to the first housing channels 322*b*1 and 322*b*2 formed in the second rotor housing 322.

Since the housing channels 321*b*1, 321*b*2, 321*c*1, 321*c*2, 322*b*1, 322*b*2, 322*c*1, 322*c*2, 323*b*1, 323*b*2, 323*c*1, 323*c*2 are formed at positions circumscribed to the epitrochoid surface, the housing channels 321*b*1, 321*b*2, 321*c*1, 321*c*2, 322*b*1, 322*b*2, 322*c*1, 322*c*2, 323*b*1, 323*b*2, 323*c*1, 323*c*2 may be formed outside the eccentric rotation range of the rotors 331, 332, 333 in the direction parallel to the extending direction of the rotation shaft 350.

The cover channels 341*a*, 341*b*, 342*a*, 342*b*, 343*a*, 343*b*, 344*a*, 344*b* should also be formed outside the eccentric rotation range of the rotors 331, 332, 333 in order to connect the housing channels 321*b*1, 321*b*2, 321*c*1, 321*c*2, 322*b*1, 322*b*2, 322*c*1, 322*c*2, 323*b*1, 323*b*2, 323*c*1, 323*c*2 on both sides in the direction parallel to the extending direction of the rotation shaft 350. The first cover channel 341*a*, 342*a*, 343*a*, 344*a* and the second cover channel 341*b*, 342*b*, 343*b*, 344*b* may have an angle of 180° with each other based on the rotation shaft penetration hole 341*c*, 342*c*, 343*c*, 344*c* on the plane of the rotor housing cover 341, 342, 343, 344.

In the fluid transfer apparatus 300 of the third embodiment, the rotor housing covers 341, 342, 343, and 344 may all be arranged to face the same direction. Since the first cover channel 341*a*, 342*a*, 343*a*, 344*a* and the second cover channel 341*b*, 342*b*, 343*b*, 344*b* of the rotor housing cover 341, 342, 343, 344 are symmetrical to each other, when the rotor housing cover 341, 342, 343, 344 rotates 180°, they may be arranged in the same shape as that before rotation. Therefore, in the fluid transfer apparatus 300 of the third embodiment, it may also be understood that the rotor housing covers 341, 342, 343, and 344 are arranged to have an angle of 180° with the other neighboring rotor housing covers 341, 342, 343, and 344.

Figure 12:
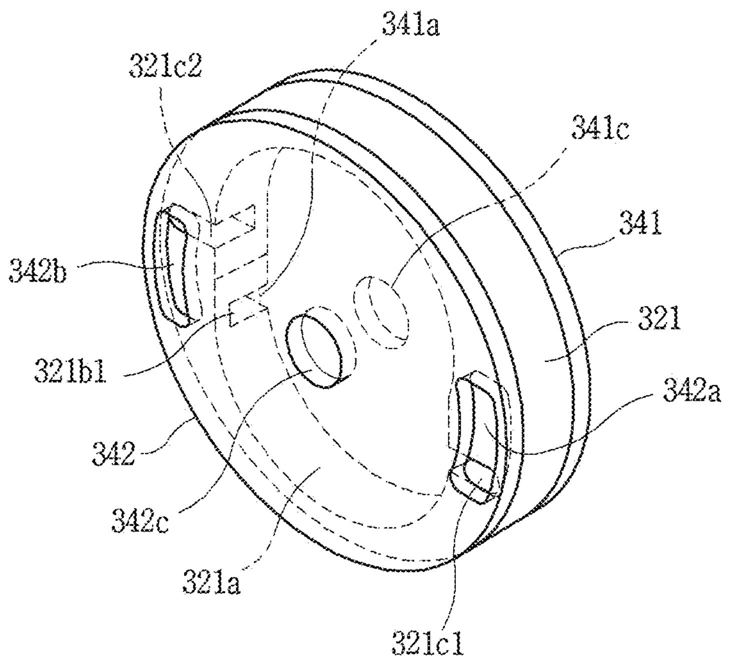
FIG. 12 is a perspective view illustrating a first rotor housing of the fluid transfer apparatus illustrated in FIG. 10 and first and second rotor housing covers disposed on both sides of the first rotor housing.

FIG. 12 is a perspective view illustrating the first rotor housing 321 and first and second rotor housing covers 341 and 342 disposed on both sides of the first rotor housing cover 321 in the fluid transfer apparatus 300 illustrated in FIG. 10.

The two first housing channels 321*b*1 and 321*b*2 may be symmetrically formed on opposite sides based on the rotation shaft 350. When the epitrochoid surface in the peanut shape is divided into two semicircles by connecting two inflection points formed on the epitrochoid surface, the two first housing channels 321*b*1 and 321*b*2 may be formed in the different semicircles.

The two second housing channels 321*c*1 and 321*c*2 may be symmetrically formed on opposite sides based on the rotation shaft 350. When the epitrochoid surface in the peanut shape is divided into two semicircles by connecting two inflection points formed on the epitrochoid surface, the two second housing channels 321*c*1 and 321*c*2 may be formed in the different semicircles.

When a distance from one (e.g., 321*b*1) of the two first housing channels 321*b*1 and 321*b*2 up to one (e.g., 321*c*2) of the two second housing channels 321*c*1 and 321*c*2 along the epitrochoid surface is a first distance and a distance from the one 321*b*1 up to another one 321*c*1 is a second distance, one (e.g., 321*b*1 to 321*c*2) of the first distance and the second distance may pass through the inflection point of the epitrochoid surface. On the other hand, another one (321*b*1 to 321*c*1) of the first distance and the second distance may not pass through the inflection point of the epitrochoid surface.

At this time, the one of the first distance and the second distance passing through the inflection point of the epitrochoid surface may be shorter than the another one not passing through the inflection point of the epitrochoid surface. For example, the distance from one (e.g., 321*b*1) of the two first housing channels 321*b*1 and 321*b*2 up to the second housing channel 321*c*1 located in the same semicircle may be longer than the distance from the one (e.g., 321*b*1) up to the second housing channel 321*c*2 located in the different semicircle.

This description may be equally applied to a first distance and a second distance based on the another one (e.g., 321*b*2) of the two first housing channels 321*b*1 and 321*b*2. Similarly, this description may be applied to distances from one of the two second housing channels 321*c*1 and 321*c*2 to the two first housing channels 321*b*1 and 321*b*2.

The cover channels 341*a*, 341*b*, 342*a*, and 342*b* formed in the rotor housing covers 341 and 342 may extend along a circumference smaller than an outer diameter of the rotor housing covers 341 and 342. The cover channels 341*a*, 341*b*, 342*a* and 342*b* may extend in a direction toward a relatively close one of the two inflection points of the epitrochoid surface. The cover channels 341*a*, 341*b*, 342*a*, and 342*b* may be formed to pass between one of the two inflection points of the epitrochoid surface and the outer diameters of the rotor housing covers 341 and 342.

Figure 13:
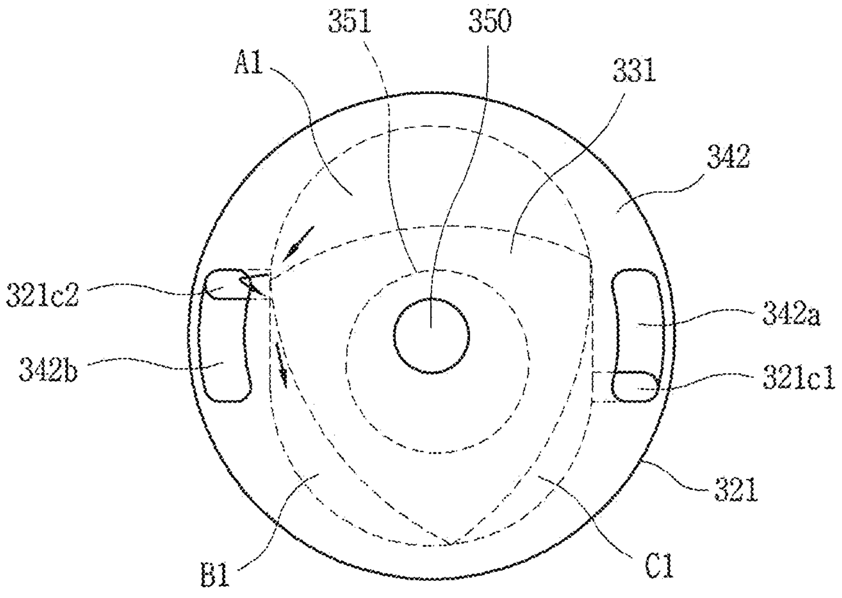
FIG. 13 is a planar view illustrating a first rotor, a first rotor housing, and a second rotor housing cover of the fluid transfer apparatus illustrated in FIG. 10.

FIG. 13 is a planar view illustrating the first rotor 331, the first rotor housing 321, and the second rotor housing cover 342 of the fluid transfer apparatus 300 illustrated in FIG. 10.

There may be a case where the two volume variance spaces A1 and B1 of the three volume variance spaces A1, B1, and C1 are connected by any one second housing channel 321*c*2 at the moment when the vertex of the first rotor 331 passes through the one second housing channel 321$c$2 of the first rotor housing 321 as the first rotor 331 rotates. At this time, one of the two volume variance spaces A1 and B1 may be in a positive pressure state, and the other in a negative pressure state. Therefore, at the moment when the two volume variance spaces A1 and B1 are connected by the second housing channel 321$c$2, a slight loss may occur in fluid transfer and pressure generation. This loss may also occur in the fluid transfer apparatus 200 of the second embodiment.

In spite of this loss, the second and third embodiments have the advantage of reducing friction by applying the rotor structure of FIGS. 15 and 16, which will be described later.

Meanwhile, in order to reduce such loss, it may be considered to modify the shape of the rotor 331, install vanes at the vertices of the rotor 331, or minimize cross-sectional areas of the housing channels 321$b$1, 321$b$2, 321$c$1, and 321$c$2.

Hereinafter, the operation of the fluid transfer apparatus 300 will be described.

Figure 14:
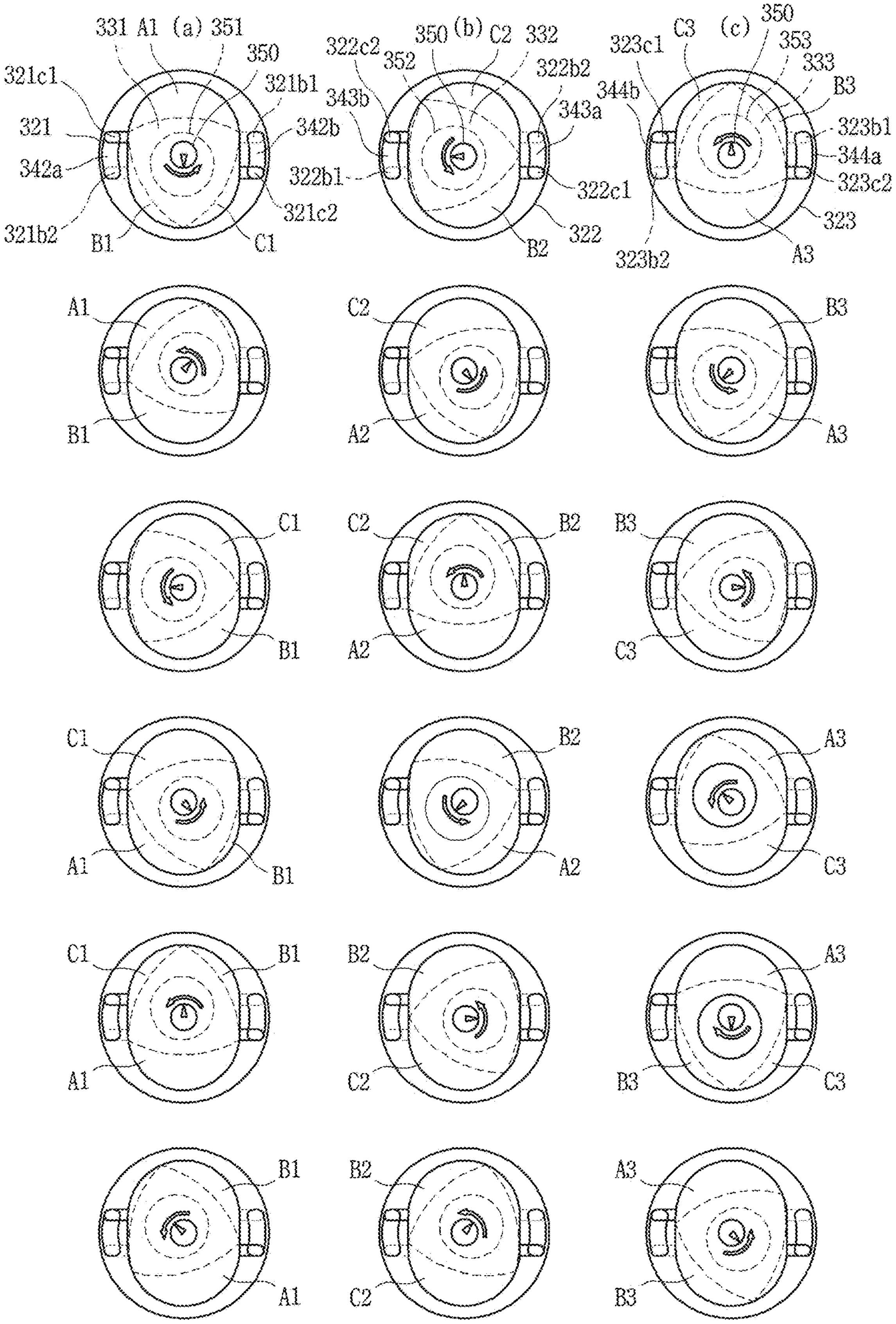
FIG. 14 is a conceptual view sequentially illustrating change in open/closed states of channels and change in volumes of volume variance spaces.

FIG. 14 is a conceptual view sequentially illustrating changes in open/closed states of channels and changes in volumes of volume variance spaces, in response to eccentric rotation of the rotors 331, 332, and 333. FIG. 14 corresponds to the fluid transfer apparatus 300 illustrated in FIG. 11, projected from the bottom.

Fluid may flow into one of the two fluid entrances 311$a$ and 312$a$ of the fluid transfer apparatus 300, and compressed fluid may be discharged into another. The opposite case may also be possible. Hereinafter, the configurations illustrated in FIG. 14 will be described on the premise that fluid is introduced through the upper fluid entrance 311$a$ and discharged through the lower fluid entrance 312$a$ based on FIG. 11.

Each figure in column (a) is a planar view illustrating the first rotor 331, the first rotor housing 321, and the cover channels 341$a$, 341$b$, 342$a$, and 342$b$ of the first rotor housing cover 341 and the second rotor housing cover 342 disposed on both sides of the first rotor housing 321.

Each figure in column (b) is a planar view illustrating the second rotor 332, the second rotor housing 322, and the cover channels 342$a$, 342$b$, 343$a$, and 343$b$ of the second rotor housing cover 342 and the third rotor housing cover 343 disposed on both sides of the second rotor housing 322.

Each figure in column (c) is a planar view illustrating the third rotor 333, the third rotor housing 323, and the cover channels 343$a$, 343$b$, 344$a$, and 344$b$ of the third rotor housing cover 343 and the fourth rotor housing cover 344 disposed on both sides of the third rotor housing 323.

Referring to row (1), the rotor housings 321, 322, and 323 may all be arranged to face the same direction. The rotor housing covers 341, 342, 343, and 344 may also be arranged to face the same direction.

The first rotor 331 may be arranged to have an angle of 90° with the second rotor 332. The second rotor 332 may be arranged to have an angle of 90° with the third rotor 333. The first rotor 331 may be arranged to have an angle of 180° with the third rotor 333.

The rotation ratio of the rotation shaft 350 and each of the rotors 331, 332, and 333 may be 3:1. Therefore, when the rotation shaft 350 rotates three times, the rotors 331, 332, and 333 may rotate once. Since the rotation shaft 350 rotates 600° from row (1) to row (6), the rotors 331, 332, and 333 may rotate 200°.

Row (1) may correspond to an initial state before the fluid transfer apparatus 300 operates. When the fluid transfer apparatus 300 operates, the first rotor 331, the second rotor 332, and the third rotor 333 may rotate eccentrically, and the fluid may flow into the first fluid entrance housing 311 through the first fluid entrance 311$a$.

When the first rotor 331 repeatedly rotates eccentrically, the fluid may flow into the space A1 through the first cover channel 341$a$ of the first rotor housing cover 341 and the first housing channel 321$b$1 of the first rotor housing 321 just before the position of the first rotor 331 becomes the state of row (1).

The space A1 may gradually decrease as the first rotor 331 rotates from row (1) to row (3), the space A2 may gradually increase as the second rotor 332 rotates from row (1) to row (3). When the first rotor 331 and the second rotor 332 rotate eccentrically to the position of row (3), the space A1 may have a minimum volume and the space A2 may have a maximum volume.

The fluid may then flow into the space A2 through the second housing channel 321$c$1 of the first rotor housing 321, the first cover channel 342$a$ of the second rotor housing cover 342, and the first housing channel 322$b$1 of the second rotor housing 322. In this process, there may be a time point at which the first cover channel 341$a$ of the first rotor housing cover 341 and the first cover channel 342$a$ of the second rotor housing cover 342 are simultaneously connected to the space A1. Therefore, there is a possibility that the fluid in the space A1 flows back to the first cover channel 341$a$ of the first rotor housing cover 341. However, since the space A2 of the second rotor housing 322 is expanding, the space A2 may become a negative pressure state. Since the space A2 is in the negative pressure state, the fluid in the space A1 may flow into the space A2 without flowing backward.

The volume of the space A2 may gradually decrease again as the second rotor 332 rotates from row (3) to row (5). And, the space A3 may gradually increase as the third rotor 333 rotates. When the second rotor 332 and the third rotor 333 rotates eccentrically to the position of row (5), the space A2 may have a minimum volume and the space A3 may have a maximum volume.

The fluid in the space A2 may flow into the space A3 through the second housing channel 322$c$1 of the second rotor housing 322, the first cover channel 343$a$ of the third rotor housing cover 343, and the first housing channel 323$b$1 of the third rotor housing 323. In this process, there may be a time point at which the first cover channel 342$a$ of the second rotor housing cover 342 and the first cover channel 343$a$ of the third rotor housing cover 343 are simultaneously connected to the space A2. Therefore, there is a possibility that the fluid in the space A2 flows back to the first cover channel 342$a$ of the second rotor housing cover 342. However, since the space A3 of the third rotor housing 323 is expanding, the space A3 may become a negative pressure state. Since the space A3 is in the negative pressure state, the fluid in the space A2 may flow into the space A3 without flowing backward.

When the first rotor 331, the second rotor 332, and the third rotor 333 rotate eccentrically further over the position of row (6), the first cover channel 343$a$ of the third rotor housing cover 343 and the first cover channel 344$a$ of the fourth rotor housing cover 344 may be simultaneously connected to the space A3. Also, the first cover channel 342$a$ of the second rotor housing cover 342 and the first cover channel 343$a$ of the third rotor housing cover 343 may be simultaneously connected to the space C2. In addition, the first cover channel 342$a$ of the second rotor housing cover 342 may be connected to the space C1. Therefore, the spaces A3, C2, and C1 may be connected together.

At this time, the space C1 may be in a positive pressure state because it is being compressed and the space C2 may be in a negative pressure state because it is expanding. Since the positive pressure and the negative pressure cancel each other, the fluid in the space A3 in the positive pressure state may be discharged to the second fluid entrance housing 312 through the first cover channel 344*a* of the fourth rotor housing cover 344.

As described above, as the rotors 331, 332, and 333 of the fluid transfer apparatus 300 rotate in the counterclockwise direction, the fluid flowing into the fluid entrance 311*a* on one side of the fluid transfer apparatus 100 may be discharged to the fluid entrance 312*a* on another side through the first cover channels 341*a*, 342*a*, 343*a*, and 344*a* of the respective rotor housing covers 341, 342, 343, and 344 and the fluid compression spaces 321*a*, 322*a*, and 323*a* of the respective rotor housings 321, 322, and 323. An amount of fluid transferred may be directly related to the volume changes of the spaces A, B and C of the respective rotor housings 321, 322, and 323 and the rotation of the rotation shaft 350.

The fluid transfer may equally be carried out through the second cover channels 341*b*, 342*b*, 343*b*, and 344*b* of the respective rotor housing covers 341, 342, 343, and 344 and the fluid compression spaces 321*a*, 322*a*, and 323*a* of the respective rotor housings 321, 322, and 323. The volume changes of the spaces B1, B2, and B3 and the volume changes of the spaces C1, C2, and C3 may cause the fluid to flow through the first cover channels 341*a*, 342*a*, 343*a*, and 344*a* and the second cover channels 341*b*, 342*b*, 343*b*, and 344*b* of the respective rotor housing covers 341, 342, 343, and 344.

4. Rotor Applicable to Fluid Transfer Apparatus of First to Third Embodiments Previously, the rotor in the shape of the triangular pillar has been described. Hereinafter, modifications of the rotor will be described.

Figure 15:
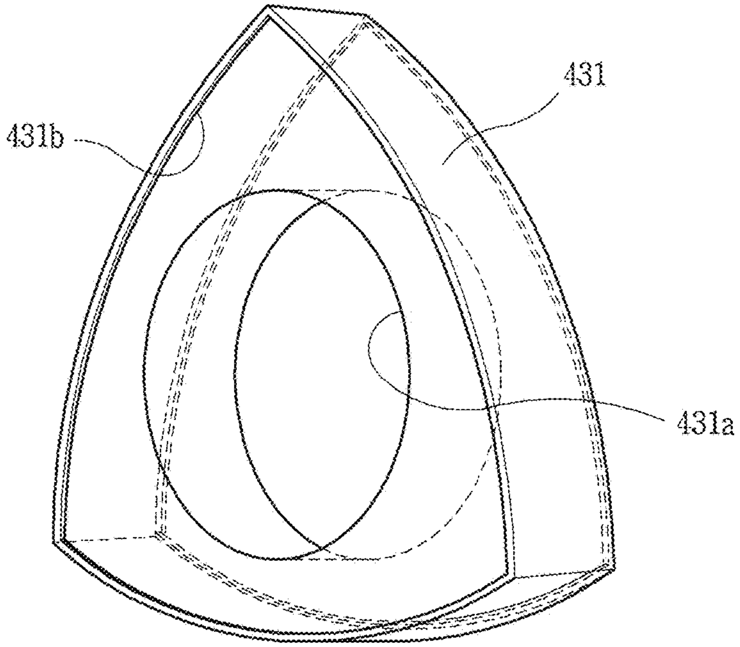
FIG. 15 is a conceptual view of a rotor that can be applied to the fluid transfer apparatuses of the first to third embodiments.

FIG. 15 is a conceptual view of a rotor 431 that can be applied to the fluid transfer apparatuses 100, 200, and 300 of the first to third embodiments.

The rotor 431 may be provided with a protrusion 431*b*. The protrusion 431*b* may protrude along an edge of a surface facing a rotor housing cover. The protrusion 431*b* may form a step with a surface of an inner side of the edge. Accordingly, when the rotor 431 rotates, the protrusion 431*b* may be brought into contact with the rotor housing cover but the surface of the inner side of the edge may be spaced apart from the rotor housing cover.

Since the rotor 431 is disposed to face two rotor housing covers, the protrusion 431*b* may be formed on each of one side and another side of the rotor 431.

When the protrusion 431*b* is provided on the rotor 431, a friction area between the rotor 431 and the rotor housing cover may be reduced. Accordingly, the protrusion 431*b* may provide an effect of reducing friction between the rotor 431 and the rotor housing cover.

In FIG. 15, an unexplained reference numeral 431*a* denotes an accommodating portion.

Figure 16:
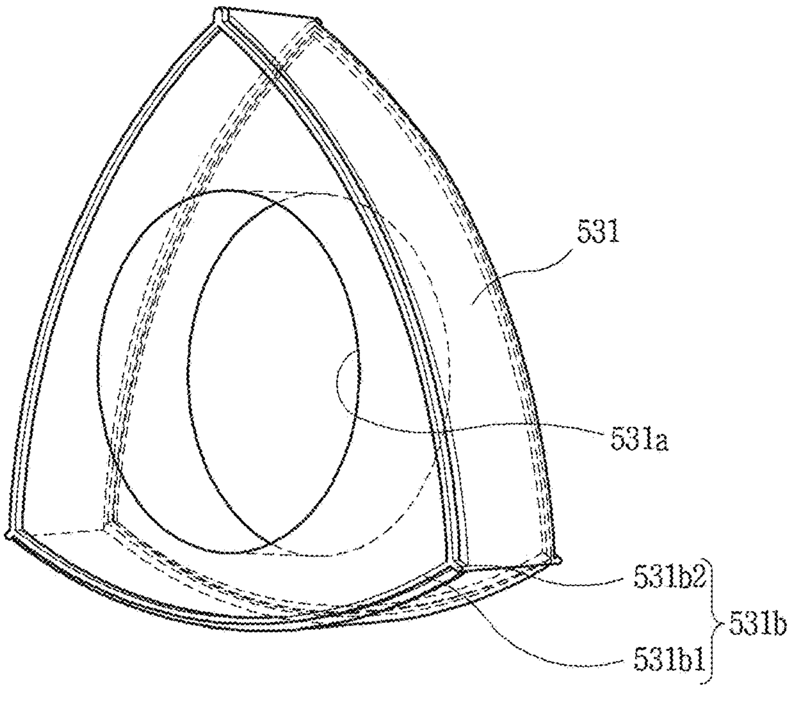
FIG. 16 is another conceptual view of a rotor that can be applied to the fluid transfer apparatuses of the first to third embodiments.

FIG. 16 is a conceptual view of a rotor 531 that can be applied to the fluid transfer apparatuses 100, 200, and 300 of the first to third embodiments.

The rotor 531 may be provided with a protrusion 531*b*. The protrusion 531*b* may be divided into a first protrusion 531*b*1 and second protrusions 531*b*2.

The first protrusion 531*b*1 may protrude along a surface facing a rotor housing cover. However, unlike FIG. 15, the first protrusion 531*b*1 may protrude not along the edge of the rotor 531 but along a circumference smaller than the edge of the rotor 531. Accordingly, the first protrusion 531*b*1 may form a step with a surface of an inner side of the first protrusion 531*b*1 as well as the edge of the rotor 531.

The second protrusions 531*b*2 may protrude from the vertices of the first protrusion 531*b*1 toward the vertices of the rotor 531. It may be understood based on the first protrusion 531*b*1 that the second protrusion 531*b*2 has a structure similar to a vane.

When the protrusion 531*b* is provided on the rotor 531, a friction area between the rotor 531 and the rotor housing cover may be reduced. Accordingly, the protrusion 531*b* may provide an effect of reducing friction between the rotor 531 and the rotor housing cover.

In FIG. 16, an unexplained reference numeral 531*a* denotes an accommodating portion.

The fluid transfer apparatus is not limited to the configurations and the methods of the embodiments described above, but the embodiments may be modified so that all or some of the embodiments are selectively combined.

INDUSTRIAL AVAILABILITY

The present disclosure can be used in industrial fields related to fluid transfer apparatuses.

The invention claimed is:

1. A fluid transfer apparatus, comprising:

a rotor housing defining a fluid compression space having an epitrochoid surface;

a rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space; and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, wherein arrangement directions of the rotors are determined based on a direction that centers of the rotors face with respect to the rotation shaft, and each rotor is arranged to face a different direction from those of neighboring rotors thereof, wherein an arrangement direction of the rotor housing cover is determined based on an arrangement direction of the first cover channel and the second cover channel with respect to the rotation shaft penetration hole, and wherein the rotor housing cover is arranged to have an angle of 90° with another neighboring rotor housing cover.

2. The fluid transfer apparatus of claim 1, wherein the first cover channel and the second cover channel are arranged to have an angle of 180° with each other with respect to the rotation shaft penetration hole on a plane of the rotor housing cover.

3. The fluid transfer apparatus of claim 1, wherein arrangement directions of the rotor housings are determined based on a direction that an epitrochoid surface faces, and repeated with regularity, and wherein arrangement directions of the rotor housing covers are repeated with regularity.

4. The fluid transfer apparatus of claim 3, wherein the rotor housing is provided by three or more in number, wherein the rotor housing cover is provided as many as a number that is one more than the number of rotor housings, and wherein the rotor housing covers and the rotor housings are alternately disposed.

5. The fluid transfer apparatus of claim 1, wherein arrangement directions of the rotor housings are determined based on a direction that the epitrochoid surface faces, and wherein the rotor housings are all arranged to face the same direction or arranged to have an angle of 90° with the neighboring rotor housings.

6. The fluid transfer apparatus of claim 5, wherein the rotor housings are all arranged to face the same direction, and wherein the rotors are arranged to have an angle of 90° with the neighboring rotors.

7. The fluid transfer apparatus of claim 5, wherein the rotor housing is provided with housing channels formed at positions circumscribed to the epitrochoid surface, and wherein the housing channels are formed to communicate with the fluid compression space, extends in a direction parallel to the extending direction of the rotation shaft, and opens toward one of a rotor housing cover on one side thereof and a rotor housing cover on another side.

8. The fluid transfer apparatus of claim 7, wherein the rotor is provided with a protrusion protruding along an edge of a surface facing the rotor housing cover.

9. A fluid transfer apparatus, comprising:

a rotor housing defining a fluid compression space having an epitrochoid surface;

a rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space; and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, wherein arrangement directions of the rotors are determined based on a direction that centers of the rotors face with respect to the rotation shaft, and each rotor is arranged to face a different direction from those of neighboring rotors thereof, and wherein the first cover channel and the second cover channel are disposed within a range that overlaps an eccentric rotation range of the rotor in a direction parallel to an extending direction of the rotation shaft, and formed through the rotor housing cover such that the fluid compression spaces of two neighboring rotor housings communicate with each other when opened.

10. A fluid transfer apparatus, comprising:

a rotor housing defining a fluid compression space having an epitrochoid surface;

a rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space; and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, wherein arrangement directions of the rotors are determined based on a direction that centers of the rotors face with respect to the rotation shaft, and each rotor is arranged to face a different direction from those of neighboring rotors thereof, wherein arrangement directions of the rotor housings are determined based on a direction that the epitrochoid surface faces, wherein the rotor housings are arranged to have an angle of 90° with the neighboring rotor housings, and wherein the rotors are arranged to have an angle of 180° with the neighboring rotors.

11. A fluid transfer apparatus, comprising:

a rotor housing defining a fluid compression space having an epitrochoid surface;

a rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space; and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, wherein arrangement directions of the rotors are determined based on a direction that centers of the rotors face with respect to the rotation shaft, and each rotor is arranged to face a different direction from those of neighboring rotors thereof, wherein arrangement directions of the rotor housings are determined based on a direction that the epitrochoid surface faces, and wherein the rotor housings are all arranged to face the same direction or arranged to have an angle of 90° with the neighboring rotor housing, wherein the rotor housing is provided with housing channels formed at positions circumscribed to the epitrochoid surface, and wherein the housing channels are formed to communicate with the fluid compression space, extends in a direction parallel to the extending direction of the rotation shaft, and opens toward one of a rotor housing cover on one side thereof and a rotor housing cover on another side, and wherein the housing channels comprise:

a first housing channel opened toward the rotor housing cover on the one side; and a second housing channel opened toward the rotor housing cover on the other side.

12. The fluid transfer apparatus of claim 11, wherein the first housing channel is provided in plurality, symmetrically formed on opposite sides based on the rotation shaft, and wherein the second housing channel is provided in plurality, symmetrically formed on opposite sides based on the rotation shaft.

13. The fluid transfer apparatus of claim 12, wherein an arrangement of the first housing channels when one rotor housing is viewed from the rotor housing cover on the one side is the same as an arrangement of the second housing channels when the one rotor housing is viewed from the rotor housing cover on the other side.

14. The fluid transfer apparatus of claim 11, wherein the housing channels formed in a rotor housing on one side and the housing channels formed in a rotor housing on another side are respectively disposed at positions not overlapping each other in the direction parallel to the extending direction of the rotation shaft, and wherein the first cover channel and the second cover channel are formed to connect the housing channels formed in the rotor housing on the one side and the housing channels formed in the rotor housing on the other side.

15. The fluid transfer apparatus of claim 11, wherein the rotor housings are arranged to have an angle of 90° with the neighboring rotor housings, and wherein the first housing channel and the second housing channel is provided by two in number, respectively, and when a distance from one of the two first housing channels up to one of the second housing channels along the epitrochoid surface is a first distance, and a distance from the one first housing channel up to another second housing channel is a second distance, one of the first distance and the second distance that passes through an inflection point of the epitrochoid surface is longer than another that does not pass through the inflection point of the epitrochoid surface.

16. The fluid transfer apparatus of claim 15, wherein the first cover channel and the second cover channel extend along a circumference smaller than an outer diameter of the rotor housing cover, and extend in a direction toward a relatively close one of two inflection points of the epitrochoid surface.

17. The fluid transfer apparatus of claim 15, wherein the rotors are arranged to have an angle of 180° with the neighboring rotors.

18. The fluid transfer apparatus of claim 11, wherein the rotor housings are all arranged to face the same direction, and wherein the first housing channel and the second housing channel are provided by two in number, respectively, and when a distance from one of the two first housing channels up to one of the second housing channels along the epitrochoid surface is a first distance, and a distance from the one first housing channel up to another second housing channel is a second distance, one of the first distance and the second distance that passes through an inflection point of the epitrochoid surface is shorter than another that does not pass through the inflection point of the epitrochoid surface.

19. The fluid transfer apparatus of claim 18, wherein the first housing channel and the second housing channel are formed so as not to overlap each other in the direction parallel to the extending direction of the rotation shaft, wherein the first housing channels are formed to overlap each other in the direction parallel to the extending direction of the rotation shaft, and wherein the second housing channels are formed to overlap each other in the direction parallel to the extending direction of the rotation shaft.

20. The fluid transfer apparatus of claim 18, wherein the first cover channel and the second cover channel extend along a circumference smaller than an outer diameter of the rotor housing cover, and pass between one of two inflection points of the epitrochoid surface and the outer diameter of the rotor housing cover.

21. The fluid transfer apparatus of claim 18, wherein the rotors are arranged to have an angle of 90° with the neighboring rotors.

22. The fluid transfer apparatus of claim 21, wherein the rotors are disposed such that two rotors have an angle of 180° with each other with respect to any one rotor interposed therebetween.

23. A fluid transfer apparatus, comprising:

a rotor housing defining a fluid compression space having an epitrochoid surface;

a rotor disposed in the fluid compression space of the rotor housing so as to divide the fluid compression space of the rotor housing into a plurality of volume variance spaces, and eccentrically coupled to a rotation shaft rotating in place so as to rotate eccentrically within the fluid compression space; and a rotor housing cover formed to cover the fluid compression space of the rotor housing, and having a rotation shaft penetration hole formed through a center thereof, and a first cover channel and a second cover channel symmetrically formed on opposite sides to each other with respect to the rotation shaft penetration hole, wherein the rotor housing cover is provided in plurality, disposed to be spaced apart from one another, wherein the rotor housing is provided in plurality, each disposed between neighboring rotor housing covers thereof, wherein the rotor is provided in plurality, disposed in the fluid compression spaces of the rotor housings, respectively, wherein arrangement directions of the rotors are determined based on a direction that centers of the rotors face with respect to the rotation shaft, and each rotor is arranged to face a different direction from those of neighboring rotors thereof, wherein arrangement directions of the rotor housings are determined based on a direction that the epitrochoid surface faces, wherein the rotor housings are all arranged to face the same direction or arranged to have an angle of 90° with the neighboring rotor housings, wherein the rotor housing is provided with housing channels formed at positions circumscribed to the epitrochoid surface, wherein the housing channels are formed to communicate with the fluid compression space, extends in a direction parallel to the extending direction of the rotation shaft, and opens toward one of a rotor housing cover on one side thereof and a rotor housing cover on another side, wherein the rotor is provided with a protrusion protruding from a surface facing the rotor housing cover, and wherein the protrusion comprises:

a first protrusion formed along a circumference smaller than an edge of the surface facing the rotor housing cover; and second protrusions protruding from vertices of the first protrusion toward vertices of the rotor.

* * * * *